(12) United States Patent
Shigematsu et al.

(10) Patent No.: US 9,178,403 B2
(45) Date of Patent: Nov. 3, 2015

(54) LAMINATED BODY MANUFACTURING METHOD

(75) Inventors: Hideki Shigematsu, Tochigi (JP); Ugeun Shin, Tochigi (JP); Fumio Takeshima, Tochigi (JP); Kuniaki Akutsu, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 160 days.

(21) Appl. No.: 13/821,140

(22) PCT Filed: Sep. 28, 2011

(86) PCT No.: PCT/JP2011/072186
§ 371 (c)(1),
(2), (4) Date: Mar. 6, 2013

(87) PCT Pub. No.: WO2012/043632
PCT Pub. Date: Apr. 5, 2012

(65) Prior Publication Data
US 2013/0160622 A1    Jun. 27, 2013

(30) Foreign Application Priority Data

Sep. 29, 2010 (JP) .................. 2010-219674
Oct. 22, 2010 (JP) .................. 2010-237910
Oct. 22, 2010 (JP) .................. 2010-237911
Oct. 22, 2010 (JP) .................. 2010-237912

(51) Int. Cl.
*H02K 15/00* (2006.01)
*H02K 15/02* (2006.01)
*B21D 28/02* (2006.01)

(52) U.S. Cl.
CPC ............. *H02K 15/024* (2013.01); *B21D 28/02* (2013.01); *Y10T 83/0448* (2015.04)

(58) Field of Classification Search
CPC ... H02K 15/024; B21D 28/02; Y10T 83/0448
USPC .................................................. 29/596, 597
See application file for complete search history.

(56) References Cited

U.S. PATENT DOCUMENTS 2,557,249 A * 6/1951 Aske .............................. 310/112
2,942,511 A * 6/1960 Moynihan ......................... 83/29
(Continued)

FOREIGN PATENT DOCUMENTS

JP    10-248215    9/1998
JP    2000-024726    1/2000
(Continued)

*Primary Examiner* — Carl Arbes
(74) *Attorney, Agent, or Firm* — Rankin, Hill & Clark LLP

(57) ABSTRACT

A laminated body manufacturing apparatus for manufacturing an annular laminated body in which each layer is defined by a plurality of segments is provided with a feeding unit that sequentially feeds a plurality of parts to be processed on a band-like sheet material to a predetermined processing position; a processing unit that separates the segment from each part to be processed by a shearing processing in the processing position; and a laminating unit that receives the segment that is separated and lowered onto the plurality of segments that are lowered and defining one layer in advance and that rotates the received segment by a predetermined angle in a circumferential direction of the segment, each time when the shearing processing is performed, so as to place the sequentially lowered segment in a position to define the laminated body.

1 Claim, 23 Drawing Sheets

(56) References Cited

U.S. PATENT DOCUMENTS

| | | | |
|---|---|---|---|
| 5,604,971 A * | 2/1997 | Steiner | 29/596 |
| 8,042,257 B2 * | 10/2011 | Kojima et al. | 29/598 |
| 2001/0037552 A1 | 11/2001 | Bareis et al. | |
| 2007/0214632 A1 * | 9/2007 | Kojima et al. | 29/596 |
| 2010/0052463 A1 * | 3/2010 | Saito et al. | 310/216.001 |

FOREIGN PATENT DOCUMENTS

| | | | |
|---|---|---|---|
| JP | 3634801 | | 3/2005 |
| JP | 2009-273202 | | 11/2009 |
| JP | 2009273202 A | * | 11/2009 |
| WO | 2008/065830 | | 6/2008 |

* cited by examiner

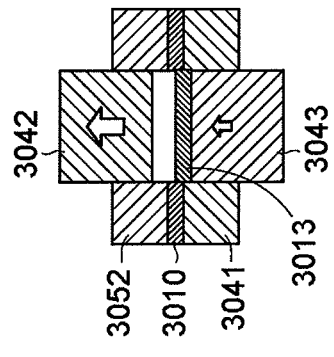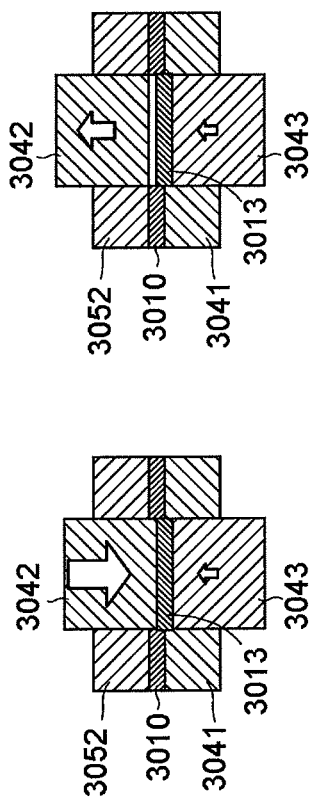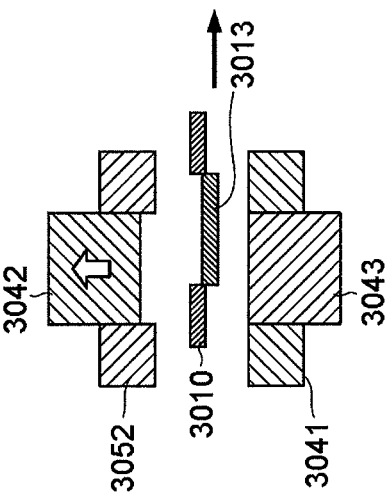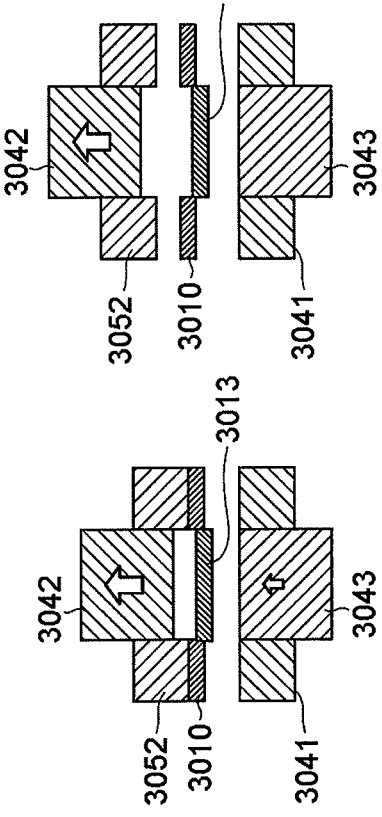

LAMINATED BODY MANUFACTURING METHOD

TECHNICAL FIELD

The present invention relates to a laminated body manufacturing apparatus and a laminated body manufacturing method for manufacturing an annular laminated body in which each layer is defined by a plurality of segments.

BACKGROUND ART

There is known a motor core which is manufactured as a laminated body by laminating several tens to several hundreds of a ring-shaped thin plate member obtained by pressing an electromagnetic steel sheet. The thickness of the thin plate member is about 0.15 to 0.5 mm. It is considered that the thinner the thickness is, the better the energy efficiency is. Further, it is also known that the ring-shaped thin plate member is configured by a plurality of arc-shaped thin plate members, in order to effectively use the material of the motor core.

For example, Patent Document 1 discloses an apparatus for manufacturing a laminated iron core by configuring one ring-shaped thin plate member with a plurality of fan-shaped segments, laminating a plurality of the thin plate members and coupling the thin plate members to each other. A central angle of the fan-shaped segment is 360°/n and one ring-shaped thin plate member is configured by "n" segments. The ring-shaped thin plate members of each layer adjacent to each other are laminated in an offset manner so that each arc-shaped segment configuring each thin plate member is stacked to be shifted from each other like a brick-laying.

In this apparatus, the segment is punched into a master die by a press machine. When "n" described above is 3, the punched segment is rotated by 120° in a circumferential direction by rotation of the master die. And then, the next segment is punched out. The punched segment is coupled to another segment adjacent thereto. In this way, one ring-shaped thin plate member is configured by three segments. Then, the master die is rotated by 60° and then a ring-shaped thin plate member of the next layer is laminated on the thin plate member in a similar manner.

According to this, the punching of the segment and the laminating of the thin plate member are carried out by a mechanism for rotating the master die. Accordingly, it is possible to configure the manufacturing apparatus of the laminated iron core in a compact manner.

However, according to Patent Document 1, the master die is caused to rotate each time when the segment is punched out. Accordingly, there is a problem that it takes some time to perform rotating and positioning of the master die and thus it is difficult to improve the production rate.

Moreover, according to Patent Document 1, the segment is cut off from the thin plate material and put into the master die by a cutting in a final process and the master die is caused to rotate by a predetermined angle each time when the cutting is performed. Accordingly, it is required to simultaneously control the feeding pitch of the thin plate material and the positioning of rotation position of the master die with high precision. For this reason, the positioning control of the thin plate material and the master die becomes complicated and thus apparatus cost is increased.

Further, Patent Document 2 has suggested a laminated body manufacturing apparatus for a rotor core, in which the laminating time of the segments becomes shorter and the segments are laminated with high precision. According to the laminated body manufacturing apparatus for the rotor core, it is possible to more rapidly and effectively laminate the segments with high precision when forming the rotor core by laminating a plurality of segments in a ring-shaped arrangement.

In this laminated body manufacturing apparatus, scrap members are generated when cutting and extracting a plurality of segments. The laminated body manufacturing apparatus disclosed in Patent Document 2 is configured so that the generated scrap members in a state of being connected are discharged to the outside of the laminated body manufacturing apparatus and then cut off to a predetermined size.

However, in the case of a stator core using a sheet material whose plate thickness is thin, there is a problem that the scrap members are easily flexed while the scrap members cut off from the plate by a press device are discharged to the outside of the laminated body manufacturing apparatus and thus it is difficult to discharge the scrap members from the laminating body manufacturing apparatus.

PRIOR ART DOCUMENTS

Patent Documents

Patent Document 1: JP-B2-3634801
Patent Document 2: WO 2008/065830

SUMMARY OF INVENTION

Embodiments of the present invention provide a laminated body manufacturing apparatus and a laminated body manufacturing method, capable of improving a production efficiency.

According to an embodiment, a laminated body may be manufactured by sequentially feeding a plurality of parts to be processed on a band-like sheet material 1010 to a predetermined processing position, separating a segment 1021 from each part to be processed by a shearing processing in the processing positions, receiving the segment 1021 which is separated and lowered onto the plurality of segments 1021 which are lowered in advance and configures one layer 1020 each time when the shearing processing is performed, rotating the received segment by a predetermined angle in a circumferential direction of the segment 1021 and placing the sequentially lowered segment 1021 at a position to configure the laminated body.

Further, according to an embodiment, a manufacturing method of a laminated body 10 may include a process for cutting the segment 12 and chip-like scrap members S1, S2 from the sheet material 32 by the lower die 110b in a state where the sheet material 32 is placed in the lower die 110b and a process for discharging the scrap members S1, S2 to the outside of the lower die 110b by rotating the lower die 110b in a state where the scrap members S1, S2 are placed in the lower die 110b.

Furthermore, according to an embodiment, a laminated body may be manufactured by sequentially feeding a plurality of parts to be processed on a band-like sheet material 3010 to first positions PA, PB and a second position PC, forming the segment 3021 and pushing back the formed segment 3021 to the sheet material 3010 by performing a predetermined processing for each part to be processed in the first positions PA, PB, separating the segment from the sheet material 3020 by pressing the segment 3021 pushed back to the sheet material in the second position PC, receiving the segment 3021 which is separated and lowered onto the plurality of segments 3021 which are lowered in advance and configures one layer each time, rotating the received segment by a predetermined angle in a circumferential direction of the segment 3021 and placing the sequentially lowered segment 3021 at a position to configure the laminated body.

BRIEF DESCRIPTION OF DRAWINGS

FIGS. 21 (*a*) to (*f*) are views showing an operation of the apparatus from a press bottom dead center to a press top dead center in a half-punching processing which is performed by the apparatus of FIG. 16.

DETAILED DESCRIPTION OF EMBODIMENTS

Hereinafter, exemplary embodiments of the present invention will be described with reference to the accompanying drawings. Here, the exemplary embodiments are examples of an embodiment for carrying out the present invention and not intended to limit the present invention. It should be noted that all the features and their combinations described in the exemplary embodiments are not necessarily considered as essential to the present invention.

First Exemplary Embodiment

Figure 1:
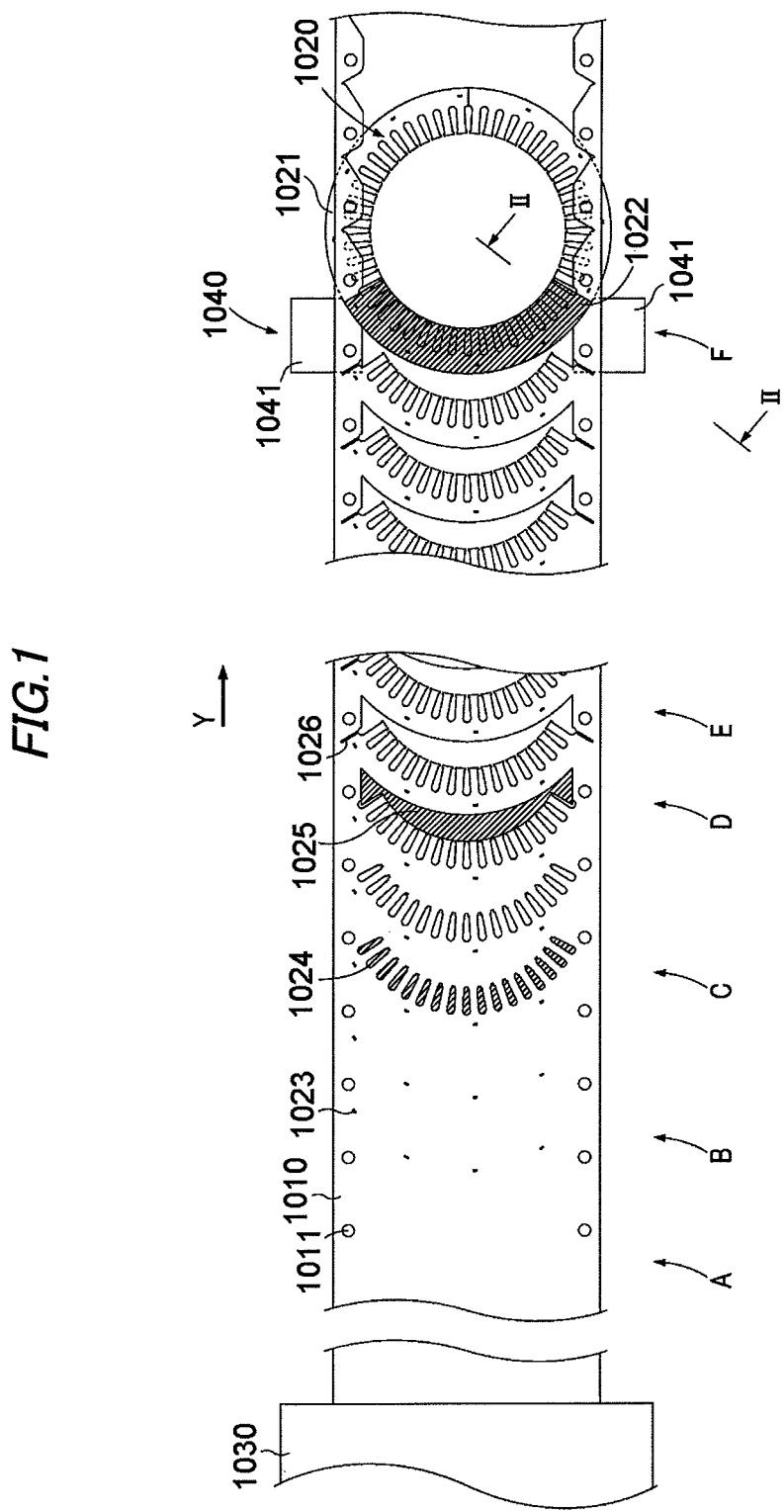
FIG. 1 is a view showing a state where a laminated body is manufactured by a laminated body manufacturing apparatus according to a first exemplary embodiment.

FIG. 1 shows a state where a laminated body is manufactured by a laminated body manufacturing apparatus according to a first exemplary embodiment. This laminated body is used as a stator core. As shown in FIG. 1, the laminated body is manufactured by configuring one annular layer 1020 with three fan-shaped segments 1021 obtained by processing a band-like sheet material 1010 and laminating a predetermined number of annular layers 1020.

As shown in FIG. 1, a laminated body manufacturing apparatus includes a feeding unit 1030 and a cutting unit 1040. The feeding unit 1030 intermittently feeds the sheet material 1010 at a predetermined feeding pitch in the Y direction so that each part to be processed on the sheet material 1010 is sequentially positioned in each of processing positions A to F. The cutting unit 1040 forms the segments 1021 by a cutting processing in a final processing position F and couples the segments to the annular layer 1020 located below.

The sheet material 1010 is obtained by processing an electromagnetic steel plate into a thin band shape and has a constant plate thickness. The plate thickness is about 0.15 to 0.5 mm. Each part to be processed on the sheet material 1010 is sequentially fed to each of the processing positions A to F by the feeding unit 1030 and subjected to a predetermined processing. And then, the processed part is provided for the formation of the segments 1021.

A central angle of the segment 1021 is 120°. Accordingly, one annular layer 1020 of a laminated body is configured by three segments 1021. The laminated body is configured by laminating a predetermined number of annular layers 1020. The number of the segments 1021 to configure one annular layer 1020 is not limited to three but may be the other number such as two, four or six, for example. However, it is noted that as the number of the segments becomes greater, the yield is improved but the production rate is decreased.

Figure 2:
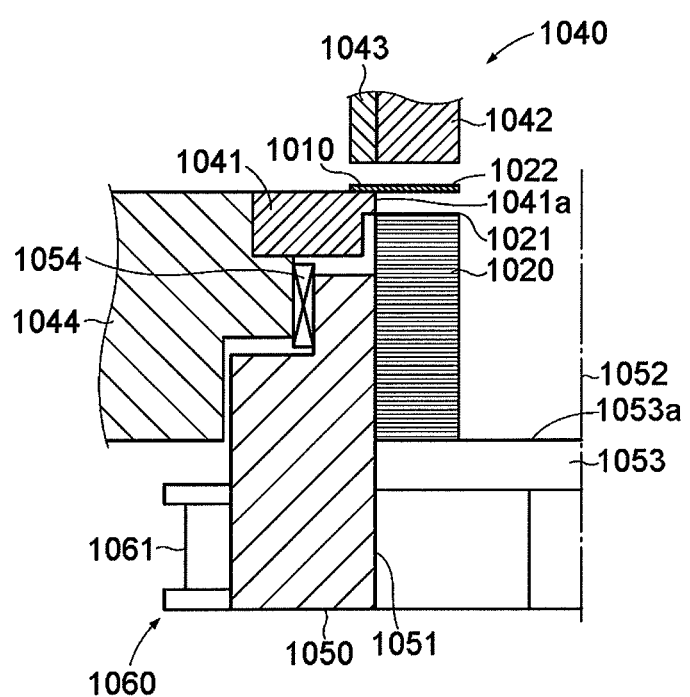
FIG. 2 is a sectional view taken along a line II-II of FIG. 1, showing a part of a laminating guide and a cutting unit of the laminated body manufacturing apparatus shown in FIG. 1.
Figure 3A:
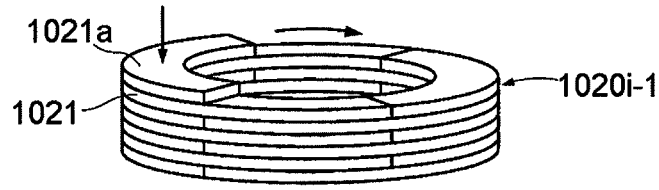
FIGS. 3 (*a*) to (*g*) are views showing a state where an annular layer is formed in the laminated body manufacturing apparatus shown in FIG. 1.
Figure 3B:
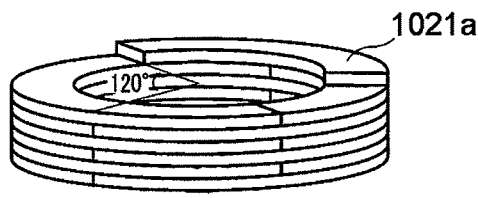
Figure 3C:
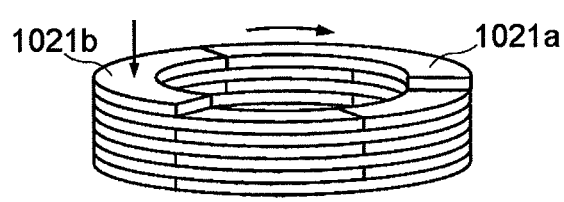
Figure 3D:
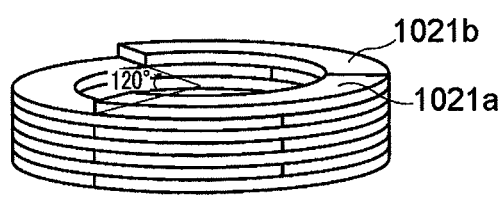
Figure 3E:
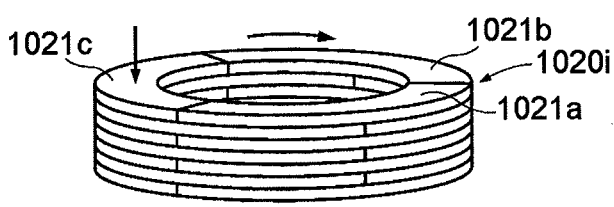
Figure 3F:
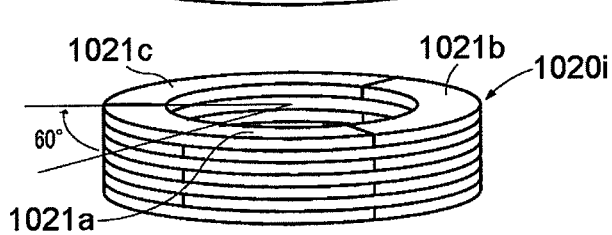
Figure 3G:
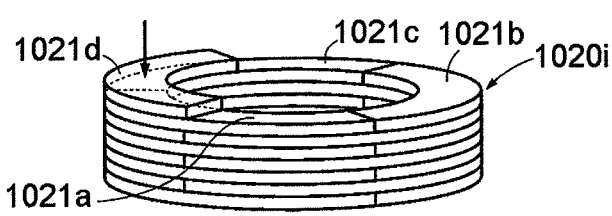

FIG. 2 is a sectional view taken along a line II-II of FIG. 1, showing a main part of the laminated body manufacturing apparatus. As shown in FIG. 2, the laminated body manufacturing apparatus includes a laminating guide 1050. The laminating guide 1050 controls a rotational position of the annular layer 1020 in a circumferential direction so that the segments 1021 are coupled to proper locations on the annular layer 1020 located therebelow by the cutting unit 1040.

The cutting unit 1040 includes a die 1041, a punch 1042 and a stripper plate 1043. The die 1041 supports the sheet material 1010. The punch 1042 pushes the sheet material 1010 into the die 1041 to cut off a hatched part 1022 shown in FIG. 1 from the sheet material 1010 and thus the segment 1021 is finally formed. The stripper plate 1043 presses the sheet material 1010 when the cutting is carried out by the punch 1042.

The punch 1042 also serves to directly press and couple the cut-off segment 1021 onto the annular layer 1020 located therebelow. The die 1041 is held in a die plate 1044 and fixed at a predetermined position.

The reference numeral 1060 in the figure denotes a rotation mechanism to rotate the laminating guide 1050 by a predetermined angle in synchronous with the cutting process by the punch 1042. The laminating guide 1050 includes a cylindrical inner wall 1051 and is rotatably supported about its central axis 1052. A cylindrical upper side wall of the laminating guide 1050 is supported by the die plate 1044 via a bearing 1054. The rotation mechanism 1060 can be configured by a pulley 1061 fixed to an outer periphery of the laminating guide 1050, a toothed belt (not shown) for rotating the pulley 1061, etc.

The laminating guide 1050 includes a support member 1053 which is rotated integrally with the laminating guide 1050 and is vertically movable by a drive unit (not shown). The support member 1053 supports the annular layer 1020 formed by the segments 1021 cut off by the cutting unit 1040 and a vertical position thereof is controlled in accordance with the number of laminated annular number 1020.

Specifically, the position of the support member 1053 is controlled in such a way that a support surface 1053a of the support member 1053 is lifted up to a position near a lower end of a cutting edge surface 1041a of the die 1041 in an initial state where the annular layer 1020 is not laminated thereon and is lowered as the number of laminated annular layer 1020 is increased. In this way, an uppermost annular layer 1020 supported on the support member 1053 is controlled to be always located at a predetermined position near the lower end of the cutting edge surface 1041a.

The laminating guide 1050 is controlled so as to rotate by a predetermined angle about its central axis 1052 every time when the segment 1021 is cut off. By such a rotation, the segments 1021 supported by the laminating guide 1050 are also rotated by a predetermined angle in its circumferential direction. This rotation is carried out in such a way that the segments 1021 to be sequentially coupled to the uppermost annular layer 1020 are placed at a position to configure a laminated body.

FIGS. 3 (a) to (g) are views showing a state where the annular layer 1020 is formed. As shown in FIG. 3 (e), one annular layer 1020 (1020i) is configured by three segments 1021 (1021a to 1021c). A predetermined angle of rotation is performed so that the segments 1021 are stacked like a brick-laying. That is, two times of 120° rotation (FIGS. 3 (b) and (d)) and one time of 60° rotation (FIG. 3 (f)) are repeatedly carried out.

That is, the laminating guide 1050 is rotated by 120° (FIG. 3 (b)) when the first segment 1021a configuring an ith annular layer 1020i is received on an i−1th annular layer 1020i−1 (FIG. 3 (a)). And then, the laminating guide is further rotated by 120° (FIG. 3 (d)) when the next segment 1021b is received (FIG. 3 (c)) and then the next segment 1021c is received (FIG. 3 (e)). In this way, placing of three segments 1021a to 1021c at a position to configure the ith annular layer 1020i is completed (FIG. 3 (e)).

Next, the laminating guide 1050 is rotated by 60° (FIG. 3 (f)). At this time, the support member 1053 is lowered by the thickness of one annular layer 1020. Then, similarly to FIG. 3 (a), a segment 1021d configuring the next i+1th annular layer 1020 is received (FIG. 3 (g)). In this way, each of the annular layers 1020 is configured by three segments 1021. Also, the segments 1021 are placed so that each segment 1021 configures a laminated body stacked like a brick-laying.

When manufacturing the laminated body, the sheet material 1010 is fed at a predetermined feeding pitch in the Y direction by the feeding unit 1030, as shown in FIG. 1. In this way, each part to be processed on the sheet material 1010 is sequentially fed to each of the processing positions A to F. In each of the processing positions A to F, the following processing is performed.

In the processing position A, pilot holes 1011 serving as a reference for positioning each part to be processed are provided on the sheet material 1010. The pilot holes 1011 are used for precise positioning of each part to be processed in each of the subsequent processing positions B to F.

In the processing position B, half-punching holes 1023 are provided for coupling the segments 1021 to the annular layer 1020 by crimping processing. The half-punching holes 1023 configure a concave part on an upper side of the sheet material 1010 and a convex part on a lower side of the sheet material. That is, the segments 1021 to be vertically stacked are coupled to each other by fitting the convex part of the upper half-punching holes 1023 and the concave part of the lower half-punching holes 1023 to each other.

A plurality of half-punching holes 1023 are provided at regular intervals along the circumferential direction of a part to be formed as the segment 1021. However, for example, four half-punching holes 1023 can be arranged at an interval of 30° along the circumferential direction in the same radial position so that the positions of the half-punching holes 1023 of the segments 1021 in the upper and lower annular layers 1020 are matched each other at a position shifted by 60° in the circumferential direction and the upper and lower annular layers 1020 are coupled to each other, as shown in FIG. 3 (g).

In the processing position C, parts to be formed as winding slots 1024 are provided by a punching processing. In the next processing position D, an unnecessary portion 1025 between adjacent parts to be processed is removed by the punching processing. Further, in the processing position E, slits 1026 defining an end edge in the circumferential direction of the segment 1021 are provided.

In the final processing position F, the cutting unit 1040 cuts off both ends of a part 1022 to be formed as the segment 1021 from the sheet material 1010 using the die 1041 and the punch 1042. The segment 1021 formed in this way is pressed downward by the punch 1042 as it is and pressed onto the uppermost annular layer 1020 which is already supported on the laminating guide 1050.

In this manner, the formed segment 1021 is crimped and coupled to the annular layer 1020 located immediately therebelow through the half-punching holes 1023. However, the segment 1021 to be coupled is shifted by 60° relative to the segment 1021 located therebelow, as shown in FIG. 3 (g) and therefore is coupled to two segments 1021 located therebelow in a state of being straddled over these two segments 1021.

Accordingly, the segments 1021 which are sequentially received by the laminating guide 1050 in the processing position F are laminated so that the segments are placed at a position to configure the laminated body by a rotation of the laminating guide 1050 and a vertical movement of the support member 1053, as shown in FIG. 3.

That is, when the coupled segment 1021 is the first or the second segment 1021 configuring one annular layer 1020, the laminating guide 1050 is rotated by 120° after receiving the segment 1021 (FIGS. 3 (*a*) to (*d*)). When the coupled segment 1021 is the third segment 1021, the laminating guide 1050 is rotated by 60° and the support member 1053 is lowered by the thickness of the annular layer 1020 so that the next segment 1021 is stacked like a brick-laying in a state of being shifted by 60° (FIGS. 3 (*e*) and (*f*)).

When the segment 1021 cut off in the processing position F is adapted to configure the first annular layer 1020 in one laminated body, it is possible to prevent an unnecessary convex part from being formed at a lower end of the laminated body by forming the half-punching holes 1023 of the segment 1021 as through holes, instead of the half-punching holes.

In this way, when the lamination of several tens to several hundreds of annular layers 1020 is completed, the laminated annular layers 1020 are extracted as a laminating body from the laminating guide 1050.

Figure 23:
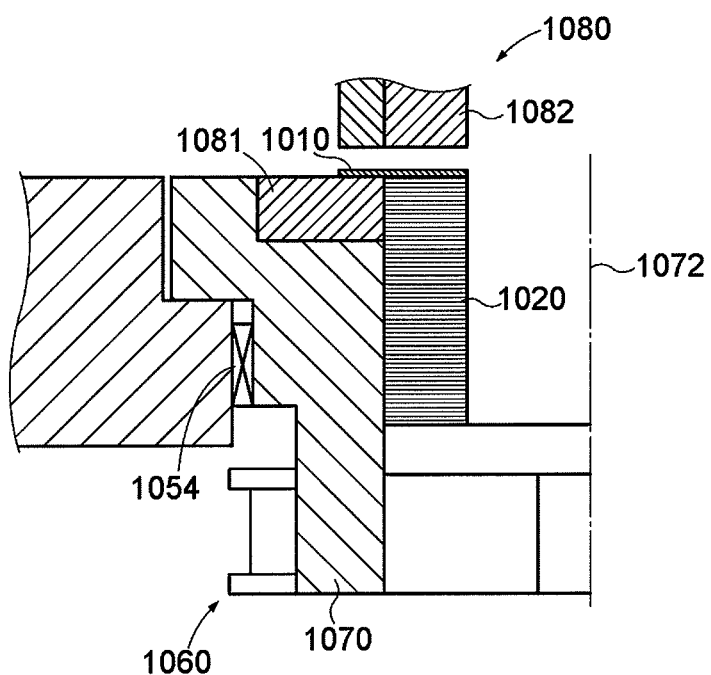
FIG. 23 is a partial sectional view showing a cutting unit and a laminating guide in a laminated body manufacturing apparatus according to a related art.

FIG. 23 shows a structure where a die 1081 of a cutting unit 1080 is configured to rotate integrally with a laminating guide 1070 around a central axis 1072 thereof. The cutting unit 1080 includes the die 1081 and a punch 1082 to cut off the segment 1021 from the sheet material 1010.

In the structure shown in FIG. 23, the die 1081 is rotated integrally with the laminating guide 1070 and the segment 1021 cut off by the punch 1082 is pushed into the die 1081 and rotated together with the die 1081. Accordingly, a die including separate cutting blades for respectively cutting three segments 1021 to configure one annular layer 1020 is used as the die 1081.

Accordingly, in the structure shown in FIG. 23, it is necessary that the rotation mechanism 1060 rotates the laminating guide 1070 integrally with the heavy die 1081 and the separate cutting blades of the die 1081 are positioned at a rotation position corresponding to the punch 1082. That is, there is a need to control the rotation against a large inertia. Particularly, since the inertia becomes large when manufacturing a core of a large motor, this causes degradation of the production rate.

In contrast, the first exemplary embodiment has a configuration that the die 1041 is held in the die plate 1044 and fixed at a predetermined position. And, it is only required to rotate the laminating guide 1050 which can be made of a relatively light material. For this reason, the inertia to be controlled is significantly small, as compared to the structure shown in FIG. 23. Accordingly, the positioning rate of the laminating guide 1050 is increased.

According to the first exemplary embodiment, the die 1041 is fixed at a predetermined position and only the laminating guide 1050 is rotated. Accordingly, the positioning rate of the laminating guide 1050 is increased and therefore it is possible to improve the production rate. Further, the configuration of the cutting device can be simplified since it is not necessary to use, as the die 1041, the cutting device including separate cutting blades for respectively cutting three segments 1021 to configure one annular layer 1020.

A suitable modification of the first exemplary embodiment is also included in the present invention. For example, coupling between each annular layer 1020 may be reinforced by welding using a laser light. Further, the coupling between each annular layer 1020 may be carried out by bonding using an adhesive, instead of crimping performed by using the punched holes 1023.

Further, in the foregoing embodiment, the segment 1021 is formed by sequentially performing a predetermined processing in the plurality of processing positions and cutting off both ends of a part to be formed as the segment 1021 by the cutting processing in the final processing position F. However, the segment 1021 may be formed by the punching processing in the final processing position F, instead of the cutting processing.

Second Exemplary Embodiment

A laminated body manufacturing apparatus 100 for a laminated body according to a second exemplary embodiment and a manufacturing method using the laminated body manufacturing apparatus 100 will be described with reference to FIGS. 4 to 15.

Figure 4:
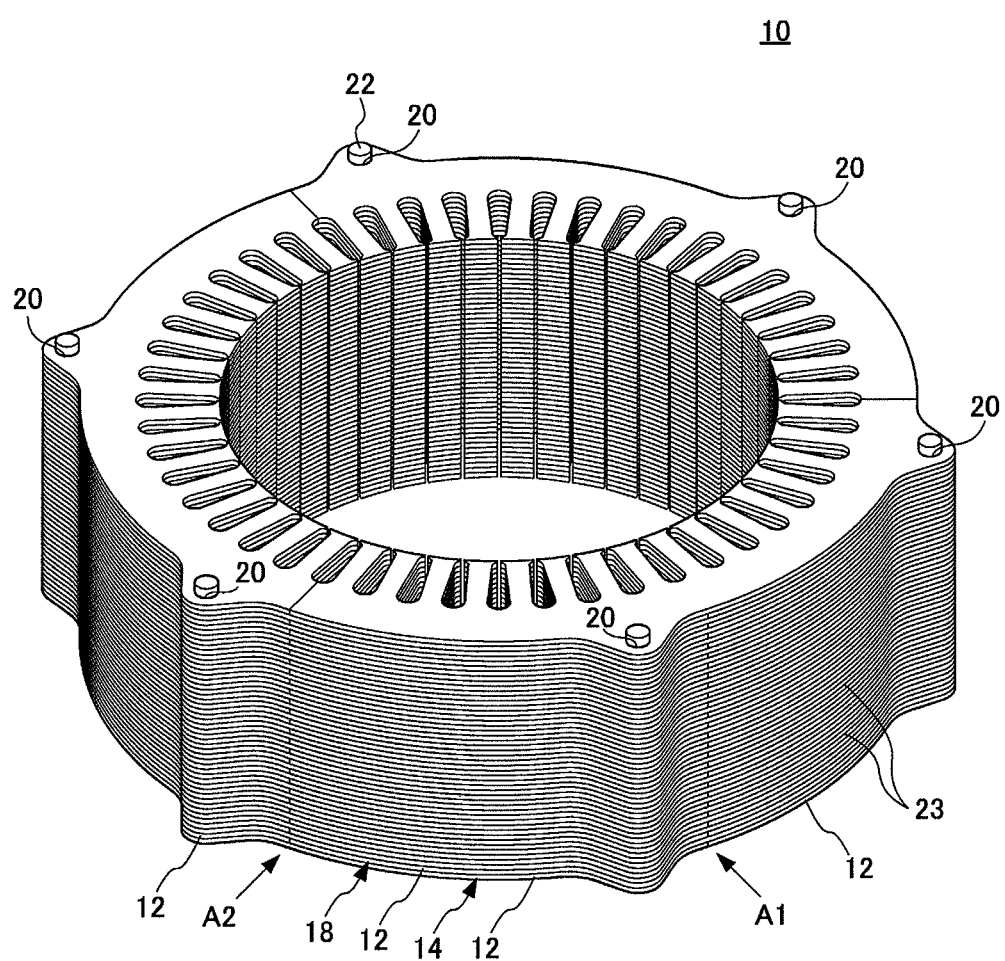
FIG. 4 is a perspective view of a laminated body which is manufactured by a laminated body manufacturing apparatus and a laminated body manufacturing method for manufacturing a laminated body according to a second exemplary embodiment.
Figure 5:
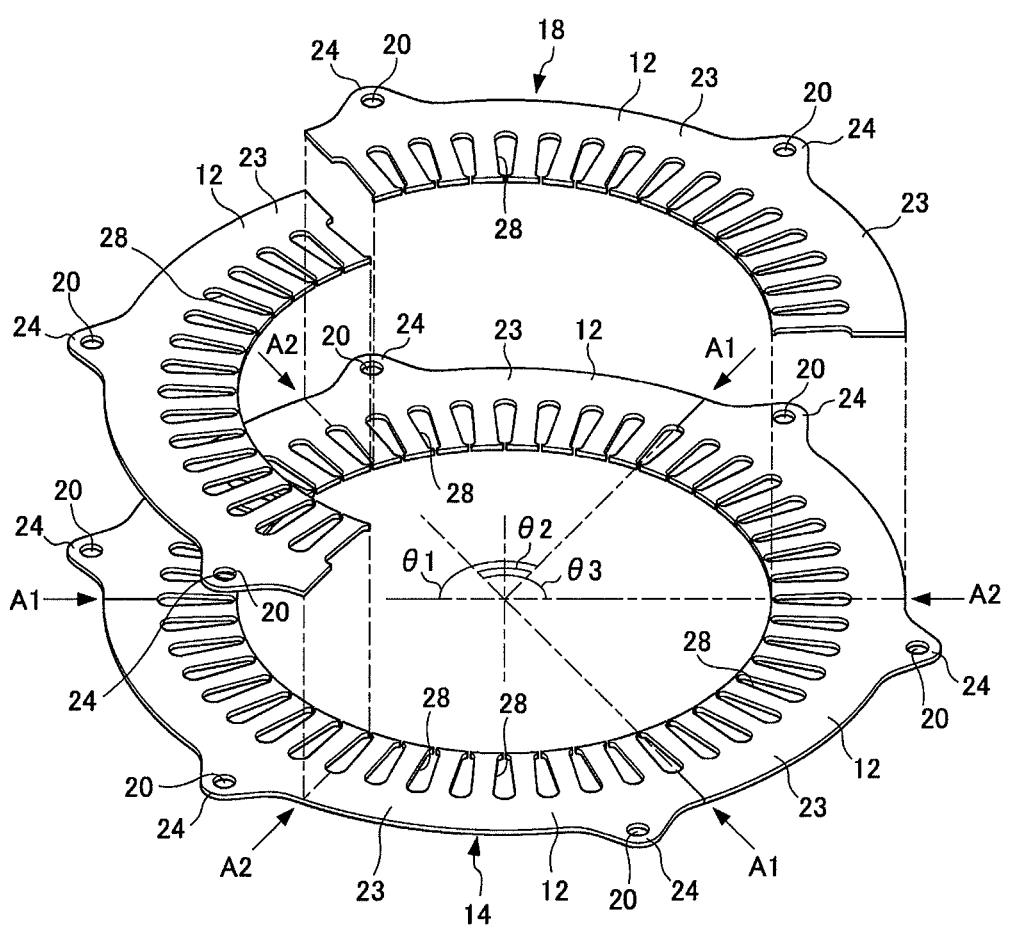
FIG. 5 is an exploded perspective view of a part of the laminated body shown in FIG. 4.

FIG. 4 is a perspective view of a laminated body (iron core 10 (stator core 10)) which is manufactured by the laminated body manufacturing apparatus 100 according to the second exemplary embodiment. FIG. 5 is an exploded perspective view of a part of the laminated body shown in FIG. 4. For example, the stator core 10 (iron core 10) configures an electric motor (motor) together with a rotor (not shown).

The iron core 10 includes a first annular layer 14 and a second annular layer 18. The first annular layer 14 is formed into a ring shape by arranging a plurality of (three in the second exemplary embodiment) segments (stator core pieces) 12 made of a thin fan-shaped electromagnetic steel plate in a circumferential direction. The second annular layer 18 is formed into a ring shape by arranging a plurality of (three in the second exemplary embodiment) segments (iron core pieces) 12 made of a thin fan-shaped electromagnetic steel plate in the circumferential direction while being shifted by a predetermined phase (60° in the second exemplary embodiment) from the first annular layer 14. In the iron core 10, the second annular layer 18 is laminated on the first annular layer 18 which forms a lowermost layer. And, the first annular layer 14 and the second annular layer 18 are alternately laminated on the second annular layer 18.

In this iron core 10, the segments configuring each layer are laminated in a state where the phases of the end parts (abutting surfaces) abutting to each other are shifted by a predetermined angle, between the stacked layers, that is, between an odd layer (the first layer, the third layer, etc.) and an even layer (the second layer, the fourth layer, etc.). Specifically, for example, the first annular layer 14 constituting the first layer (lowermost layer) as an odd layer is configured so that the end positions A1 of the segments 12 abutting to each other are disposed in a total of three places at intervals of a predetermined angle θ1 (120° in the second exemplary embodiment), as shown in FIG. 5. Meanwhile, the second annular layer 18 constituting the second layer as an even layer is configured so that the end positions A2 of the segments 12 abutting to each other are shifted from the end positions A1 by a predetermined angle θ2 (60° in the second exemplary embodiment) and disposed in a total of three places at intervals of a predetermined angle θ3 (120° in the second exemplary embodiment). The first annular layer 14 and the second annular layer 18 have the same shape, except for having a phase difference of the predetermined angle θ2.

As shown in FIG. 5, a pair of substantially semi-circular convex parts (protrusions, convex parts on a plate side) 24, 24 are formed at an arc-shaped edge of an outer periphery of the segment 12. Six convex parts 24 are disposed at regular intervals (at intervals of 60°) in the first annular layer 14 in which three segments 12 are included. The convex part 24 is provided at its substantially central portion with a hole 20 into which a pin 22 (see FIG. 4) is fitted. Similarly, six convex parts 24 are disposed at regular intervals (at intervals of 60°) in the second annular layer 18. The convex part 24 is provided at its substantially central portion with a hole 20 into which a pin 22 (see FIG. 4) is fitted.

Here, the phase difference between the first annular layer 14 and the second annular layer 18 is 60° and the holes 20 are also arranged at intervals of 60°. Accordingly, the locations of the holes 20 are matched in the first annular layer 14 and the second annular layer 18.

Further, the segment 12 is formed with a plurality of slits 28 which are disposed at substantially regular intervals along an arc-shaped edge of an inner periphery of the segment and opened to the arc-shaped edge of the inner periphery. Accordingly, the first annular layer 14 and the second annular layer 18 are similarly formed with the plurality of slits 28 which are disposed at substantially regular intervals along an arc-shaped edge of an inner periphery of the annular layers and opened to the arc-shaped edge of the inner periphery.

In the iron core 10, six holes (coupling parts, through holes) 20 are respectively provided for each layer of the first annular layer 14 and the second annular layer 18 laminated and the pins (coupling members) 22 are fitted into the holes 20 along a lamination direction (an axial direction), so that coupling between each layer is achieved. The lamination number of the first and second annular layers 14, 18 forming the iron core 10 can be properly varied in accordance with using conditions of the iron core, etc. Further, coupling between each layer of the iron core 10 becomes stronger by an adhesive 23 applied to the upper and lower surfaces of the segment 12. Preferably, the adhesive 23 has a substantially thin-film form in a state of being applied to the surface of the segment 12 or the sheet material 32 (see FIG. 6), etc., so that an adhesive force thereof does not occur. When a heating processing or a cooling processing is carried out, the adhesive force occurs.

Next, an example of a manufacturing method for manufacturing the iron core 10 thus configured will be described with reference to the drawings.

First, an iron core manufacturing line 30 is described.

Figure 6:
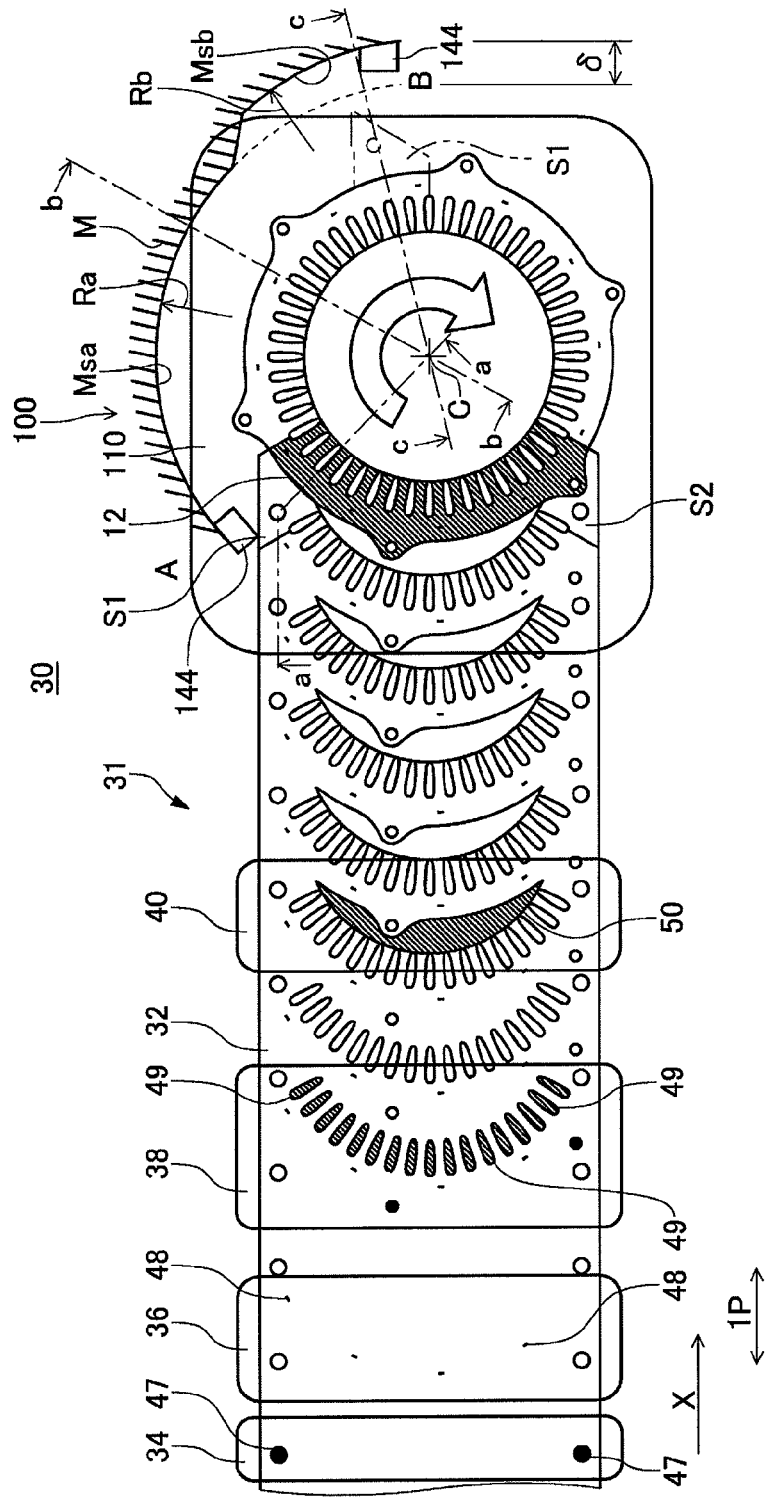
FIG. 6 is a schematic plan view showing a configuration of a manufacturing line for the laminated body shown in FIG. 4.

As shown in FIG. 6, the iron core manufacturing line 30 for manufacturing the iron core 10 includes a forming device 31 and the laminated body manufacturing apparatus 100. In this iron core manufacturing line 30, a sheet material 32 made of a thin strip-shaped electromagnetic steel plate is placed in the forming device 31 and fed by one pitch (arrow 1P in FIG. 6 corresponds to one pitch) in a direction of arrow X. And, the sheet material 32 is subjected to a predetermined processing by the forming device 31 and formed into the segment 12 by the laminated body manufacturing apparatus 100. In this way, the iron core 10 is formed.

The forming device 31 includes a pilot hole forming die 34, a crimping cut forming die 36, a crimping bend slot forming die 38 and a window-vent-hole forming die 40 from an upstream side toward a downstream side in the feeding direction of the sheet material 32 (in the direction of arrow X). Each of these dies is configured by an upper die (not shown) including a punch for punching a hole or a segment, for example, and a lower die (not shown) which is disposed opposite to the upper die. The sheet material 32 is fed along the upper surface of the lower die. An operation of theses dies will be later.

Figure 7:
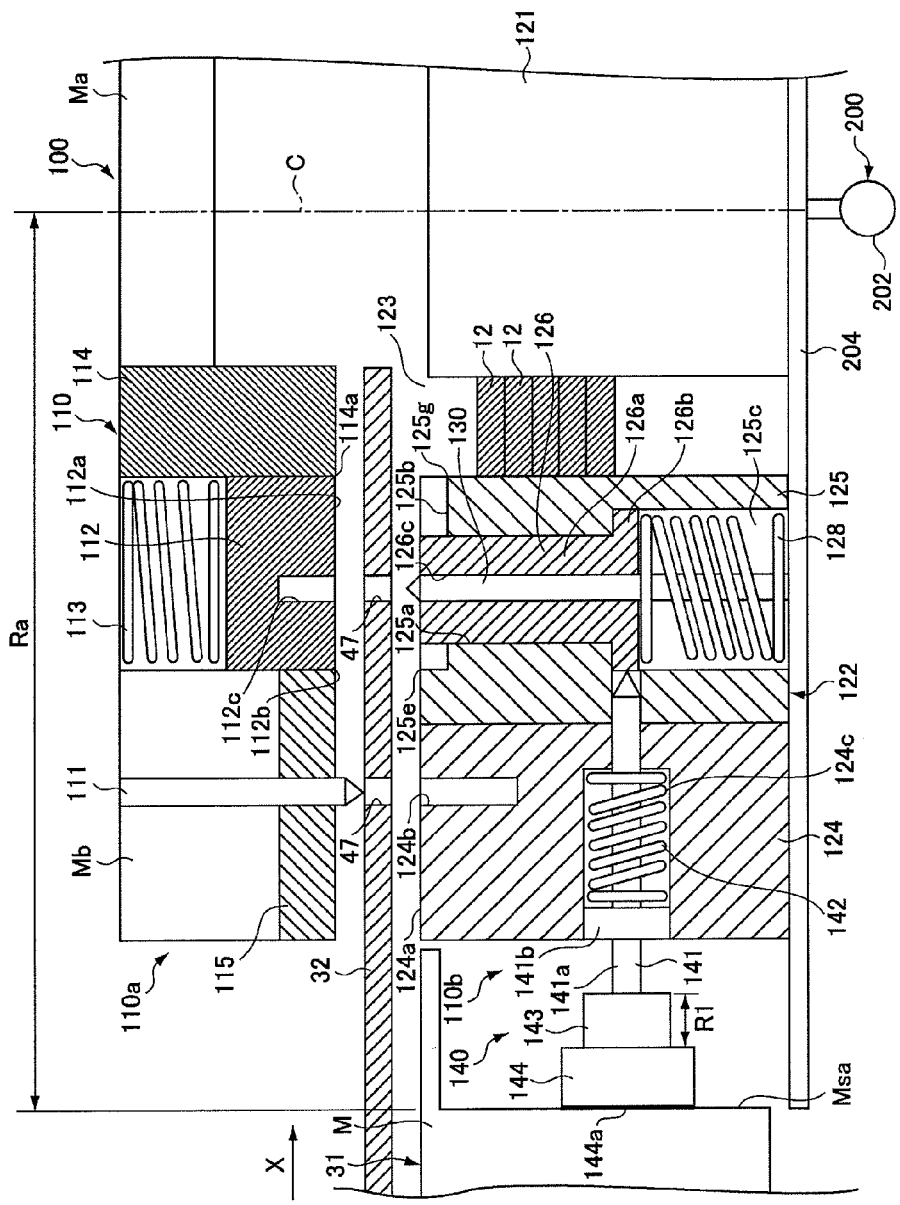
FIG. 7 is a schematic sectional view of a laminated body manufacturing apparatus taken along a line a-a of FIG. 6, explaining a process of a method for manufacturing the laminated body shown in FIG. 4.

FIG. 7 is a schematic sectional view taken along a line a-a of FIG. 6. As shown in FIG. 6, the laminated body manufacturing apparatus 100 is arranged at the downstream side of the forming device 31 in a direction of arrow X (at the downstream side in the feeding direction of the sheet material 32). The laminated body manufacturing apparatus 100 includes a press device 110 having an upper die 110a and a lower die 110b and a rotation device 200 for rotating the lower die 110b of the press device 110 (see FIG. 8).

Further, the lower die 110b includes a substantially cylindrical outer guide 122 which has a rotation center C as a central axis and a cylindrical inner guide 121 which is disposed on the inside of the outer guide 122 and has the rotation center C as a central axis. A substantially ring-shaped space 123 is formed between the outer guide 122 and the inner guide 121.

The laminated body manufacturing apparatus 100 is configured so that the sheet material 32 subjected to the predetermined processing by the forming device 31 is press-cut by the upper die 110a and the lower die 110b to form the segment 12 and the first annular layer 14 and the second annular layer 18 are sequentially laminated in the substantially ring-shaped space 123.

Hereinafter, a configuration of the laminated body manufacturing apparatus 100 is described.

First, a configuration of the upper die 110a is described.

As shown in FIG. 7, the upper die 110a is configured to reciprocate from a stand-by position (a top dead center position) to a bottom dead center position by a press mechanism (not shown). The press mechanism may be a displacement mechanism having a crank mechanism, for example, or the entire press mechanism may be fixed to a frame M of the iron core manufacturing line 30.

The stand-by position refers to a position of the upper die 110a when a cam of the crank mechanism is placed at the top dead center position. That is, the stand-by position refers to an uppermost movement position of the upper die 110a (see FIG. 7). The bottom dead center position refers to a position of the upper die 110a when the cam of the crank mechanism is placed at the bottom dead center position. That is, the bottom dead center position refers to a lowermost movement position of the upper die 110a (see FIG. 11).

The upper die 110a includes two sets of "an upper pressing member 115", "an upper pilot pin 111", "a first punch 112", "a compression coil 113" for urging the first punch 112 toward the lower die 110b and "a second punch 114".

"The second punch 114" and "the first punch 112" urged toward the lower die 110b by "the compression coil 113" are attached to a frame Ma which is vertically movable by the press mechanism.

Further, "the upper pressing member 115" and "the upper pilot pin 111" are attached to a frame Mb which is disposed to vertically move relative to the frame Ma in a direction (toward the upstream side in the feeding direction of the sheet material 32) opposite to the direction of arrow X of the frame Ma via an elastic member (not shown).

Two upper pressing members 115 can be formed to press the periphery of each of two pilot holes 47 which are formed for every one pitch at both ends of the sheet material 32.

Two upper pilot pins 111 are respectively formed to penetrate the central portion of the upper pressing member 115 and have an outer diameter to allow the pilot pin to be inserted into the pilot hole 47. The upper pilot pin 111 is adapted to perform the positioning of the cut-off member 32a (see FIG. 10) cut from the sheet material 32, on the side of a remaining sheet material 32.

Figure 10:
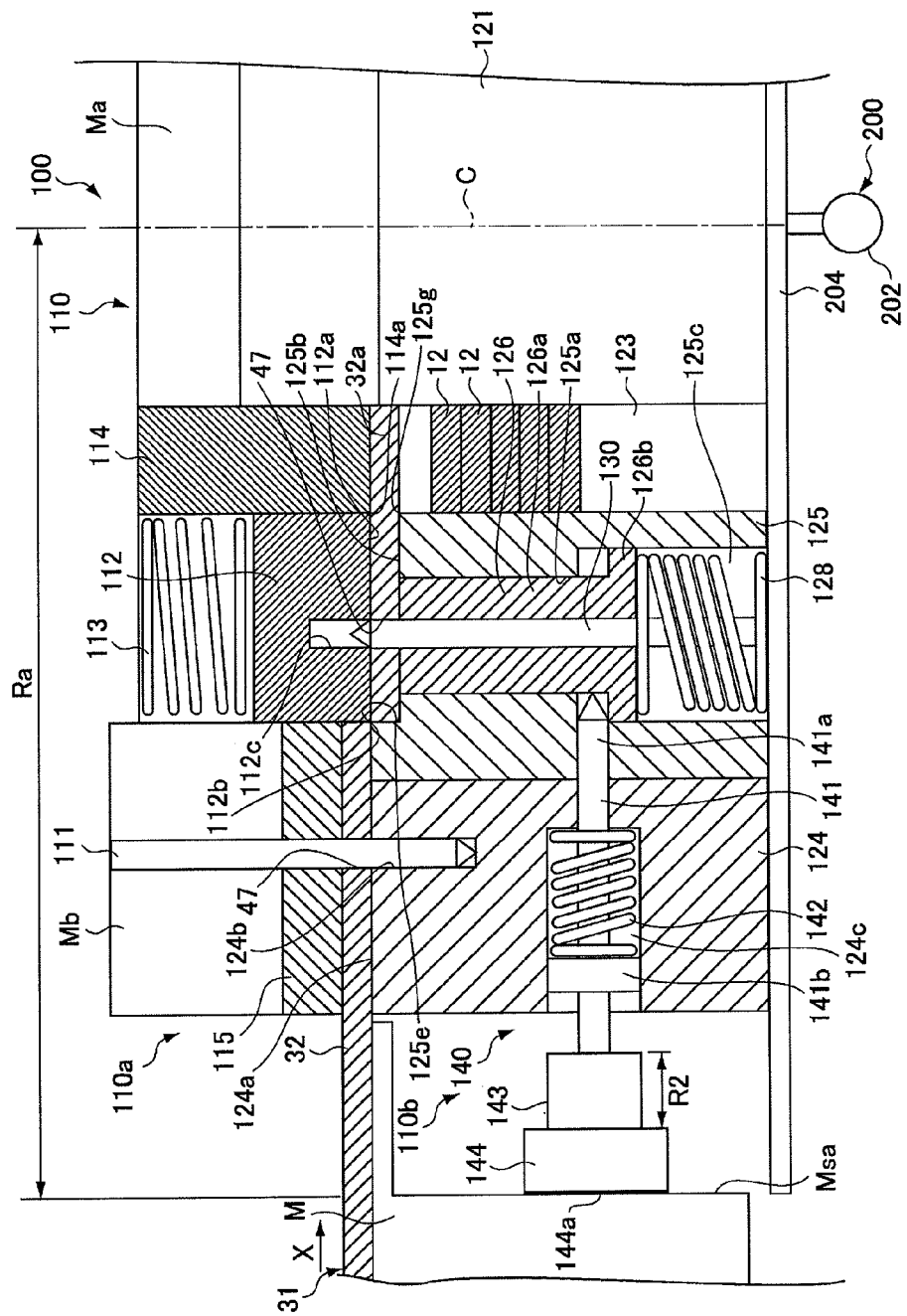
FIG. 10 is a schematic sectional view of the laminated body manufacturing apparatus taken along the line a-a of FIG. 6, explaining a process of the laminated body manufacturing method subsequent to FIG. 9.

As shown in FIG. 7, two first punches 112 are configured to cut off the cut-off member 32a (a member in a state where the segment 12 and scrap members S1, S2 are connected) from the sheet material 32 (see FIG. 10). A pressing surface 112a is formed at a lower surface (a surface facing the lower die 110b) of the two first punches 112. The pressing surface 112a is intended to hold the part of the cut-off member 32a cut from the sheet material 32, which becomes the scrap members S1, S2. A cutting blade for cutting off the cut-off member 32a from the sheet material 32 is formed at an edge 112b (in the upstream side in the feeding direction of the sheet material 32) of each pressing surface 112a in a direction opposite to the direction of arrow X. Insertion holes 112c with a lower side being opened are formed at a substantially central portion of each of two first punches 112. Each insertion hole 112c is a hole having a size substantially the same as an outer diameter of a leading end of a lower pilot pin 130, so as to allow insertion of each leading end of two lower pilot pins 130 having an outer diameter which can be inserted through the pilot hole 47 formed at the sheet material 32.

Herein, a distance between a central axis of the upper pilot pin 111 and a central axis of the lower pilot pin 130 corresponds to one pitch in the feeding of the sheet material 32.

Two compression coils 113 are respectively disposed between the frame Ma and the first punch 112 and set to a predetermined value of elasticity. The predetermined value of elasticity refers to a value of elasticity in which it is possible to secure "rigidity" enough for applying a downward urging force capable of cutting the sheet material 32 to the first punch 112 (see FIG. 10). Further, in this predetermined value of elasticity, when the cut-off member 32a cut from the sheet material 32 in the bottom dead center position is collided with a lower jig 125 and then the frame Ma is further moved toward the lower die 110b, the first punch 112 can stop the cut-off member 32a in a state of being collided with the lower jig 125 against the movement of the frame Ma (see FIG. 11).

Figure 11:
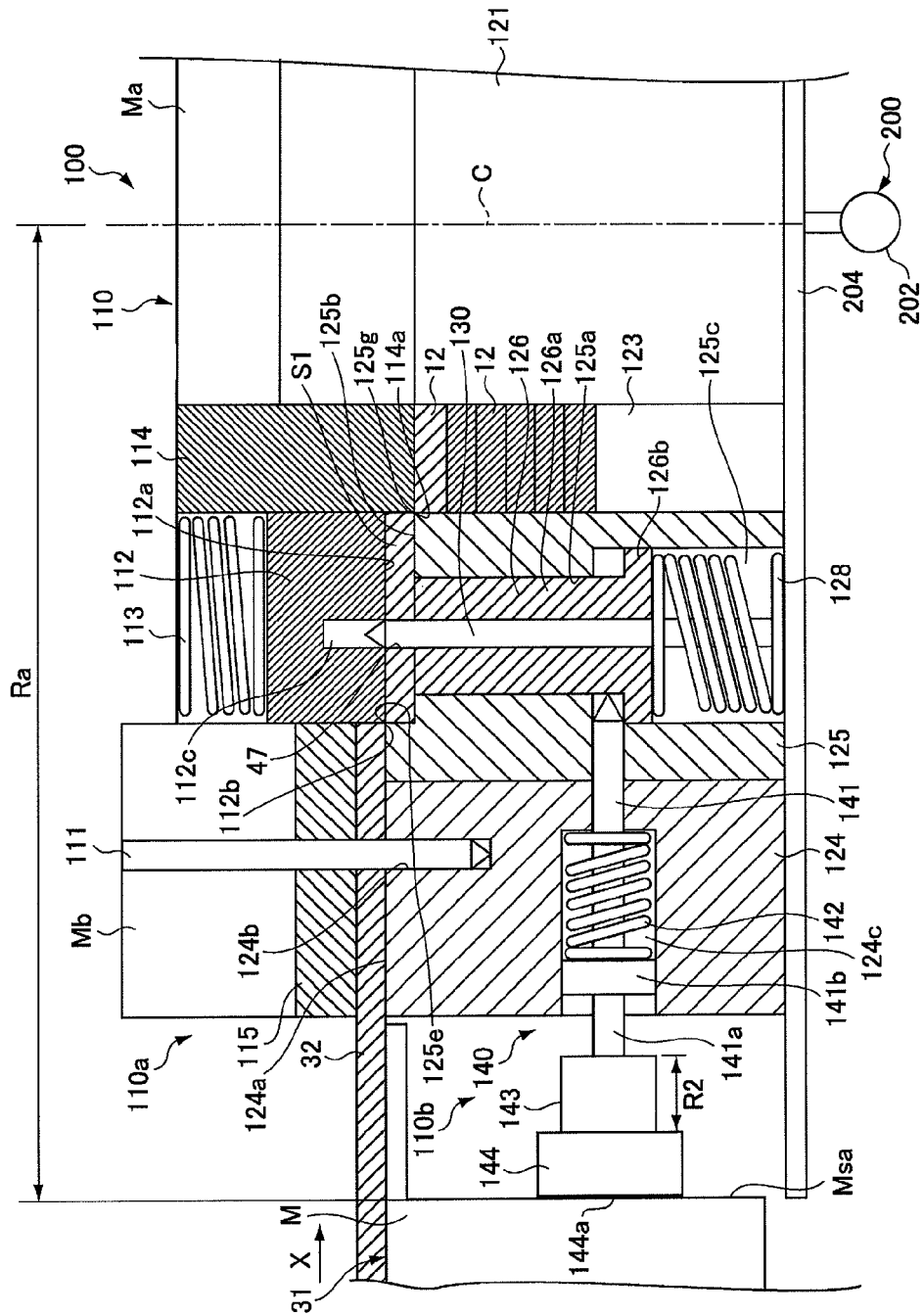
FIG. 11 is a schematic sectional view of the laminated body manufacturing apparatus taken along the line a-a of FIG. 6, explaining a process of the laminated body manufacturing method subsequent to FIG. 10.

As shown in FIG. 7, cutting blades are formed at a lower surface (a surface facing the lower die 110b) of each of two second punches attached to the frame Ma, specifically, at an edge 114a of the lower surface in a direction (at the upstream side in the feeding direction of the sheet material 32) opposite to the direction of arrow X (see FIG. 11). The cutting blades are intended for respectively press-cutting off the cut-off member 32a (a member in a state where the segment 12 and the scrap members S1, S2 are connected) cut off by the first punch 112 into the segment 12 and the scrap members S1, S2.

Next, a configuration of the lower die 110b is described.

As described above, the lower die 110b includes the substantially cylindrical outer guide 122 and the cylindrical inner guide 121 disposed on the inside of the outer guide 122. The substantially ring-shaped space 123 is formed between the outer guide 122 and the inner guide 121 in the lower die 110b. The lower die 110b is placed on a rotation table 204 which is rotated by the rotation device 200.

Figure 8:
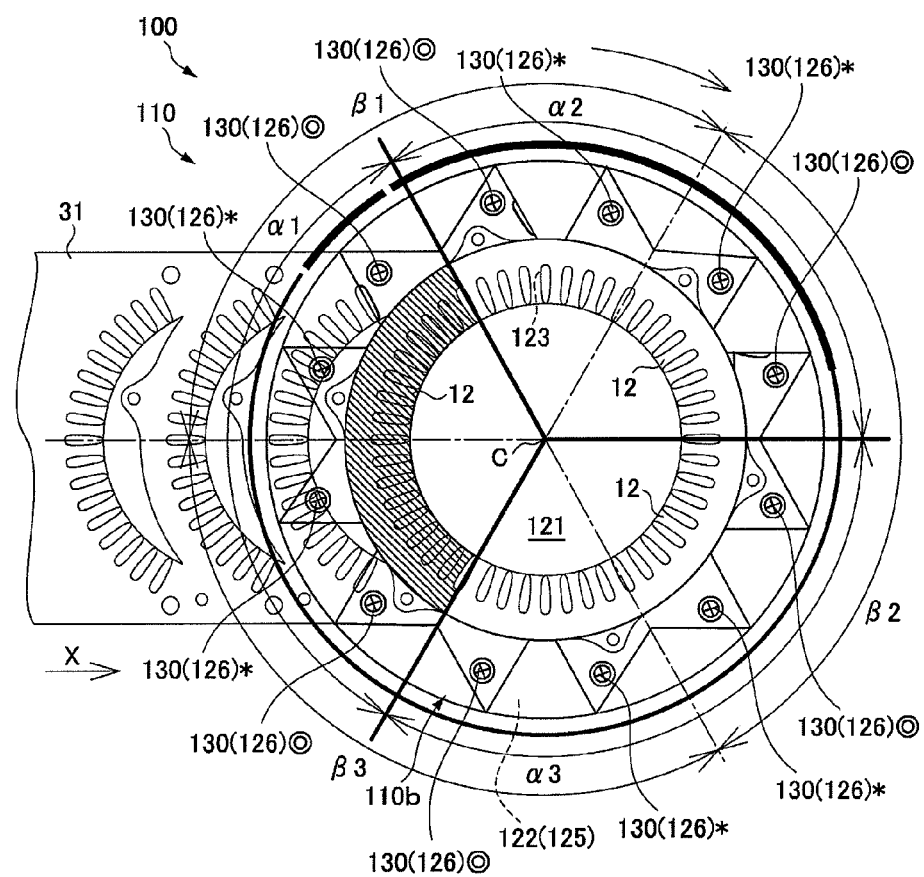
FIG. 8 is a schematic plan view of a laminated body manufacturing apparatus in the laminated body manufacturing line shown in FIG. 6.

FIG. 8 is a plan view of the laminated body manufacturing apparatus 100.

Three segments 12 configuring the first annular layer 14 are respectively accommodated in a range α1, a range α2 and a range α3, which are obtained by dividing the space 123 formed in the lower die 110b into three ranges. Further, three segments 12 configuring the second annular layer 18 are respectively accommodated in a range β1, a range β2 and a range β3, which are obtained by dividing the space 123 formed in the lower die 110b into three ranges.

The outer guide 122 includes two sets of "a lower pressing member 124", "a lower jig 125", "a pusher 126", "a compression coil 128", "a lower pilot pin 130" and "a cam mechanism 140" at each of the regions (a total of six regions) of the outer guide 122 respectively corresponding to the range α1, range α2 and range α3 and respectively corresponding to the range β1, range β2 and range β3. Accordingly, the outer guide 122 includes a total of twelve sets. The pusher 126 is accommodated in the lower jig 125 so as to be movable in the vertical direction. The compression coil 128 urges the pusher 126 upward (toward the upper die 110a). The lower pilot pin 130 is intended for positioning and holding the cut-off member 32a. The cam mechanism 140 is intended for releasing the holding of the scrap members S1, S2 by the lower pilot pin 130, which is cut from the cut-off member 32a.

It is noted that although only the pusher 126 and the lower pilot pin 130 are shown in FIG. 8, the pusher 126 and the lower pilot pin 130 relating to the range α1, range α2 and range α3 are indicated with "⊙" appended to the reference numeral. Further, it is noted that the pusher 126 and the lower pilot pin 130 relating to the range β1, range β2 and range β3 are indicated with "*" appended to the reference numeral.

Since the lower die 110b is rotated in synchronous with the vertical reciprocating movement of the upper die 110a, the upper die 110a sequentially corresponds to (a total of six ranges of) the range α1, range α2 and range α3 and the range β1, range β2 and range β3 of the lower die 110b.

In the following, the parts provided in the outer guide 122 of the lower die 110b are described. That is, descriptions are made for "the lower pressing member 124", "the lower jig 125", "the pusher 126" accommodated in the lower jig 125 so as to be movable in the vertical direction, "the compression coil 128" for urging the pusher 126 upward (toward the upper die 110a), "the lower pilot pin 130" for positioning and holding the cut-off member 32a and "the cam mechanism 140" for releasing the holding of the scrap members S1, S2 by the lower pilot pin 130, which is cut from the cut-off member 32a.

As shown in FIG. 7, the lower pressing member 124 is provided on the outer guide 122 to face the upper pressing member 115 of the upper die 110a. The lower pressing member 124 is formed at its upper surface 124a with an insertion hole 124b through which a leading end of the upper pilot pin 111 can be inserted. The lower pressing member 124 is formed at its side surface (an outer surface of the outer guide 122) with a concave part 124c through which a pin 141 of the cam mechanism 140 is inserted.

The lower jig 125 is provided to face the first punch 112 of the upper die 110a. The lower jig 125 is formed at its upper surface with a concave stepped part 125b having a predetermined depth. A cutting blade is formed at an end 125e of the stepped part 125b of the lower jig 125 (in the upstream side in the feeding direction of the sheet material 32) in a direction opposite to the direction of arrow X. The lower jig 125 is configured so that the end 125e and the edge 112b of the first punch 112 are in cooperation with each other to cut off the sheet material 32, thereby extracting the cut-off member 32a. A cutting blade is formed at a side of the lower jig 125 opposite to the stepped part 125b, that is, at an end 125g of the lower jig 125 (in the downstream side in the feeding direction of the sheet material 32) in the direction of arrow X. The lower jig 125 is configured so that the end 125g and the edge 114a of the second punch 114 are in cooperation with each other to cut off the cut-off member 32a, thereby separating the segment 12 and the scrap members S1, S2, respectively.

The pusher 126 includes a cylindrical part 126a and a collar part 126b formed at one end of the cylindrical part 126a. The pusher 126 is provided with a through hole 126c which penetrates the pusher 126 in an axial direction of the cylindrical part 126a.

The lower jig 125 includes an insertion hole 125a at its substantially central portion and an accommodation part 125c located below the insertion hole 125a. The cylindrical part 126a of the pusher 126 can be inserted through the insertion hole 125a extending in the vertical direction. The accommodation part 125c is intended to accommodate the collar part 126b of the pusher 126. The pusher 126 is disposed in the lower jig 125 so that the cylindrical part 126a is inserted into the insertion hole 125a and the collar part 126b abuts against an inner wall of the accommodation part 125c.

Further, the lower pilot pin 130 is disposed at a central portion of the insertion hole 125a of the lower jig 125 and extends upward through the through hole 126c of the pusher 126 from the lower side. A leading end of the lower pilot pin 130 is projected upward from a leading end of the cylindrical part 126a of the pusher 126 and therefore can be inserted through the insertion hole 112c of the first punch 112.

The compression coil 128 for urging the pusher 126 upward (toward the upper die 110a) is provided in a lower side of the collar part 126b of the pusher 126. The pusher 126 is configured so that a leading end of the cylindrical part 126a is projected more upward than the stepped part 125b in an upper surface of the lower jig 125 by an upward urging force of the compression coil 128 (toward the upper die 110a). Preferably, a projection amount of the leading end of the cylindrical part 126a projected from the stepped part 125b in the upper surface of the lower jig 125 is equal to the predetermined depth of the stepped part 125b described above. The leading end of the cylindrical part 126a is retreated to the stepped part 125b when the pressing force of the first punch 112 through the cut-off member 32a exceeds the urging force of the compression coil 128.

The urging force of the compression coil 128 is set to be smaller than the urging force of the compression coil 113 of the first punch 112.

The cam mechanism 140 includes the pin 141, a compression coil spring 142 for urging the pin 141 in a direction away from the pusher 126, and a sliding member 144 disposed at a base end of the pin 141 via an elastic body 143. The elastic body 143 urges the pin 141 in a direction close to the pusher 126 with a predetermined force when the sliding member 144 is pressed in the direction close to the pusher 126.

As shown in FIG. 7, the pin 141 is inserted through the lower pressing member 124 so as to be movable in the horizontal direction. The pin 141 includes a rod-like pin body 141a having a pointed tip and a collar part 141b formed at a central portion of the pin body 141a. The collar part 141b is adapted to slide along an inner peripheral surface of the concave part 124c. The pin body 141a is disposed to penetrate a bottom surface of the concave part 124c toward the pusher 126. The bottom surface of the concave part is formed in the horizontal direction of the lower pressing member 124.

The pin 141 has a configuration that a leading end of the pin 141 abuts against the collar part 126b of the pusher 126 when a leading end of the cylindrical part 126a of the pusher 126 is projected from the stepped part 125b in the upper surface of the lower jig 125 and also, the leading end of the pin 141 is positioned at an upper side (at a side of the upper die 110a) of the collar part 126b of the pusher 126 when the leading end of the cylindrical part 126a of the pusher 126 is retreated to the stepped part 125b in the upper surface of the lower jig 125.

The compression coil spring 142 is disposed at a compressed state between the collar part 141b of the pin 141 and the bottom surface of the concave part 124c. Accordingly, the compression coil spring 142 urges the pin 141 in a direction away from the pusher 126. The pin 141 can be advanced toward the pusher 126 against the compression coil spring 142 when the leading end of the cylindrical part 126a of the pusher 126 is retreated to the stepped part 125b in the upper surface of the lower jig 125. The pin 141 can restrict the pusher 126 so as not to move upward (toward the upper die 110a) when the leading end of the pin 141 is positioned at an upper side (at a side of the upper die 110a) of the collar part 126b (see FIG. 10).

The sliding member 144 is disposed at the base end of the pin 141 via the elastic body 143. The urging force of the elastic body 143 is greater than the urging force of the compression coil spring 142. The leading end of the pin 141 is located in the collar part 126b of the pusher 126 when the leading end of the cylindrical part 126a of the pusher 126 is projected from the stepped part 125b in the upper surface of the lower jig 125 (see FIGS. 7 and 9).

The sliding member 144 includes a sliding surface 144a on the side opposite to the pusher 126. The sliding surface 144a is engaged with a sliding surface Msa and a sliding surface Msb of the frame M (see FIG. 6). The sliding surface 144a is configured so as not to be separated from the sliding surface Msa and the sliding surface Msb by the urging force of the elastic body 143 and the urging force of the compression coil spring 142, even if the sliding member 144 moves in the circumferential direction of the sliding surface Msa and the sliding surface Msb in accordance with the rotation of the lower die 110b (the rotation table 204).

Since an angle of both ends of one segment 12 is 120° as shown in FIG. 6, one segment 12 is formed while the lower die 110b (the rotation table 204) is rotated by 120°. As described above, the outer guide 122 of the lower die 110b includes, as one set, "the lower pressing member 124", "the lower jig 125", "the pusher 126", "the compression coil 128", "the lower pilot pin 130" and "the cam mechanism 140". The sliding member 144 of the cam mechanism 140 is rotated by 120° from "A" position to "B" position while one cycle operation of one set of the elements is carried out. In the sliding surface from the "A" position to the "B" position, the sliding surface Msa is about ¾ of 120° from the first and the sliding surface Msb is continued to the sliding surface Msa.

A distance Rb between the sliding surface Msb and the rotation center C is greater than a distance Ra between the sliding surface Msa and the rotation center C by a distance "δ" (see FIG. 6). That is, when the sliding member 144 is moved toward the "B" position, the sliding member 144 is moved in a direction away from the pusher 126 by the distance "δ" in a predetermined timing of being switched from the sliding surface Msa to the sliding surface Msb, and the pin 141 is moved in a direction away from the pusher 126.

In a timing where a sliding surface of the sliding member 144 is switched from the sliding surface Msa to the sliding surface Msb, the leading end of the cylindrical part 126a of the pusher 126 is retreated to the stepped part 125b in the upper surface of the lower jig 125 and the leading end of the pin 141 is located at an upper side (the upper die 110a) of the collar part 126b of the pusher 126. For this reason, as the pin 141 is moved in a direction away from the pusher 126, the restriction for the upward movement (toward the upper die 110a) of the leading end of the pin 141 relative to the collar part 126b is eliminated. Accordingly, the pusher 126 is moved upward by the urging force of the compression coil 128 and the leading end of the cylindrical part 126a of the pusher 126 is projected from the stepped part 125b in the upper surface of the lower jig 125. At this time, the pusher 126 pushes up the scrap members S1, S2 which is fitted into the lower pilot pin 130 and thus the scrap members S1, S2 are separated.

Next, a manufacturing method of the iron core 10 by the iron core manufacturing line 30 is described with reference to FIGS. 6 to 15.

First, a manufacturing method of the iron core 10 by the forming device 31 is described. Each process of this manufacturing method is carried out each time when the sheet material 32 is fed by one pitch.

As shown in FIG. 6, first, the sheet material 32 is fed by a feeding unit (not shown) and the pilot holes 47, 47 are perforated in the sheet material 32 by the pilot hole forming die 34 of the forming device 31. These pilot holes 47, 47 are engaged with pilot pins (not shown) provided on each die or the iron core manufacturing line 30 in each process and therefore serve for positioning the sheet material 32 at a predetermined position in each subsequent process.

After the pilot holes 47 are perforated in the sheet material 32, the sheet material 32 is fed by one pitch (in a direction of arrow X) and the pilot holes 47 are engaged with the pilot pins, so that the positioning of the sheet material 32 is carried out. The positioning work using the pilot holes 47 and the pilot pins is similarly carried out in each process and thus a detailed description thereof will be omitted.

A crimping convex part 48 is formed in the sheet material 32 by the crimping cut forming die 36 of the forming device 31. Back side of the convex part 48 is recessed.

Then, the sheet material 32 is fed by three pitches using the feeding unit (in the direction of arrow X) and a plurality of long holes 49 are perforated in the sheet material 32 by the crimping bend slot forming die 38.

Then, the sheet material 32 is fed by two pitches using the feeding unit (in the direction of arrow X) and a crescent-shaped window-vent-hole 50 is perforated in the sheet material 32 by the window-vent-hole forming die 40.

Next, a manufacturing method of the iron core 10 by the laminated body manufacturing apparatus 100 is described. Similarly, each process of this manufacturing method is carried out each time when the sheet material 32 is fed by one pitch.

In the laminated body manufacturing apparatus 100, one segment 12 is formed from the sheet material 32 while the sheet material 32 is fed by one pitch and the segment 12 is placed at a predetermined position of the space 123 of the lower die 110b by rotating the lower die 110b of the press device 110 by 120° about the rotation center C, so that the first annular layer 14 and the second annular layer 18 are alternately formed.

Since a phase angle between the first annular layer 14 and the second annular layer 18 is 60°, the rotation device 200 is adapted to rotate the lower die 110b by 180° when three segments 12 are accommodated in the space 123 to form the first annular layer 14 and then the second annular layer 18 is formed on the first layer 14. Similarly, the lower die 110b is also rotated by 180° when the second annular layer 18 is formed and then the first annular layer 14 is formed on the second annular layer 18.

As shown in FIG. 7, the pilot holes 47, 47 located at the most downstream side in the feeding direction of the sheet material 32 are placed at a position of the lower pilot pin 130 and the pilot holes 47, 47 located at the immediately upstream side in the feeding direction are placed at a position of the upper pilot pin 111 when the sheet material 32 is fed by one pitch in the direction of arrow X.

Figure 9:
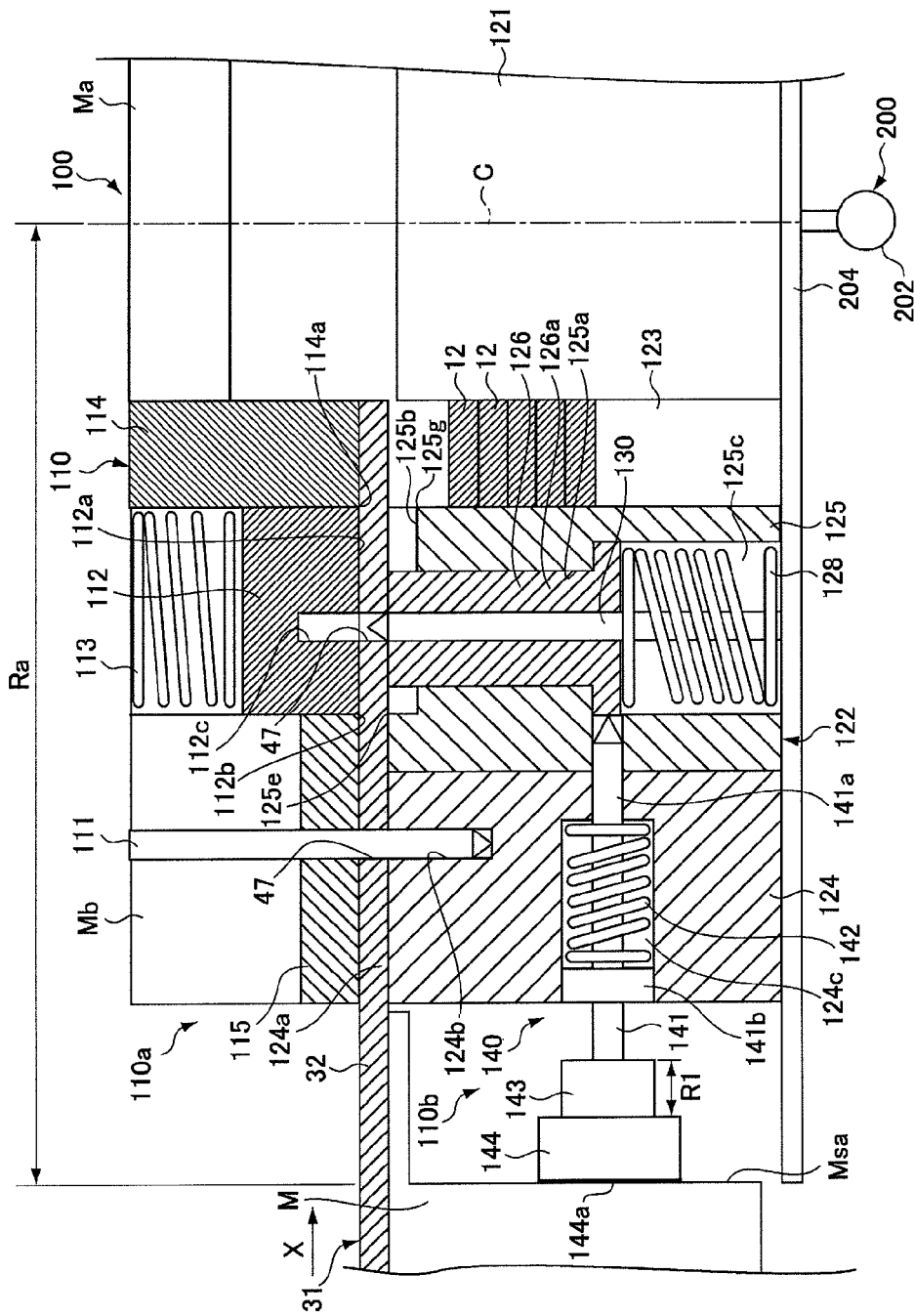
FIG. 9 is a schematic sectional view of the laminated body manufacturing apparatus taken along the line a-a of FIG. 6, explaining a process of the laminated body manufacturing method subsequent to FIG. 7.

Next, as the upper die 110a is moved downward, the upper pilot pin 111 penetrates the pilot hole 47 and then is inserted through the insertion hole 124b of the lower pressing member 124, so that the sheet material 32 is positioned relative to the press device 100 (the lower die 110b), as shown in FIG. 9. And then, the positioned sheet material 32 is held between the upper pressing member 115 and the lower pressing member 124.

Further, the pressing surface 112a of the first punch 112 is brought into contact with an upper surface of the sheet material 32. Accordingly, the sheet material 32 is sandwiched between the pressing surface 112a of the first punch 112, an upper surface of the lower jig 125 and the leading end of the cylindrical part 126a of the pusher 126 projected from the stepped part 125b in the upper surface of the lower jig 125.

Furthermore, as shown in FIG. 10, the compression coil 113 has "rigidity" enough for applying a downward urging force capable of cutting the sheet material 32 to the first punch 112. Accordingly, as the upper die 110a is moved downward (toward the lower die 110b), the first punch 112 cuts off the cut-off member 32a [in a state where the segment 12 and scrap members S1, S2 are connected] from the sheet material 32 in such a way that the sheet material 32 is press-cut by a cutting blade formed at the edge 112b of the first punch 112 and a cutting blade formed at the end 125e of the lower jig 125.

At this time, a leading end of the cylindrical part 126a of the pusher 126 is retreated to the stepped part 125b in the upper surface of the lower jig 125 by a pressing force of the first punch 112 through the cut-off member 32a which is cut out. Further, "the pilot holes 47, 47 located at the most downstream side in the feeding direction" as described above become the pilot holes 47, 47 of the cut-off member 32a which is cut out. The lower pilot pin 130 is inserted into the pilot holes 47, 47 of the cut-off member 32a. Accordingly, the cut-off member 32a which is cut out is positioned by the lower pilot pin 130.

Also after the cut-off member 32a is cut by the first punch 112, the cut-off member 32a is strongly sandwiched between the pressing surface 112a of the first punch 112, the stepped part 125b in the upper surface of the lower jig 125 and the leading end of the cylindrical part 126a of the pusher 126 retreated to the stepped part 125b in the upper surface of the lower jig 125, by the urging force of the compression coil 113.

As the leading end of the cylindrical part 126a of the pusher 126 is retreated to the stepped part 125b in the upper surface of the lower jig 125 by the pressing force of the first punch 112 through the cut-off member 32a which is cut out, the collar part 126b of the pusher 126 is moved downward.

The sliding member 144 connected to the pin 141 is configured to slide along a small-diameter sliding surface Msa at the time of cutting the cut-off member 32a. For this reason, the pin 141 is moved in a direction close to the pusher 126 by an expansion force of the elastic body 143. Here, the elastic body 143 is expanded from a dimension R1 (see FIG. 9) to a dimension R2 (see FIG. 10). Accordingly, a leading end of the pin 141 is placed on an upper side of the collar part 126b and the upward movement (movement toward the upper die 110a) of the pusher 126 is restricted, so that the leading end of the cylindrical part 126a of the pusher 126 is maintained in a state of being retreated to the stepped part 125b in the upper surface of the lower jig 125.

Furthermore, as shown in FIG. 11, as the upper die 110a is downwardly moved toward the bottom dead center position, the second punch 114 cuts off the segment 12 and the scrap members S1, S2 in such a way that the cut-off member 32a is press-cut by a cutting blade formed at the lower edge 114a of the second punch 114 and a cutting blade formed at the other end 125g of the stepped part 125b.

The cut segments 12 are pushed into the space 123 between the inner guide 121 and the outer guide 122 by the second punch 114 to form the first annular layer 14 and the second annular layer 18. At this time, the segments 12 can be coupled to each other by matching the crimping convex parts 48 provided in the segments 12 (the sheet material 32) with each other in the lamination direction when the segments 12 are stacked.

Figure 12:
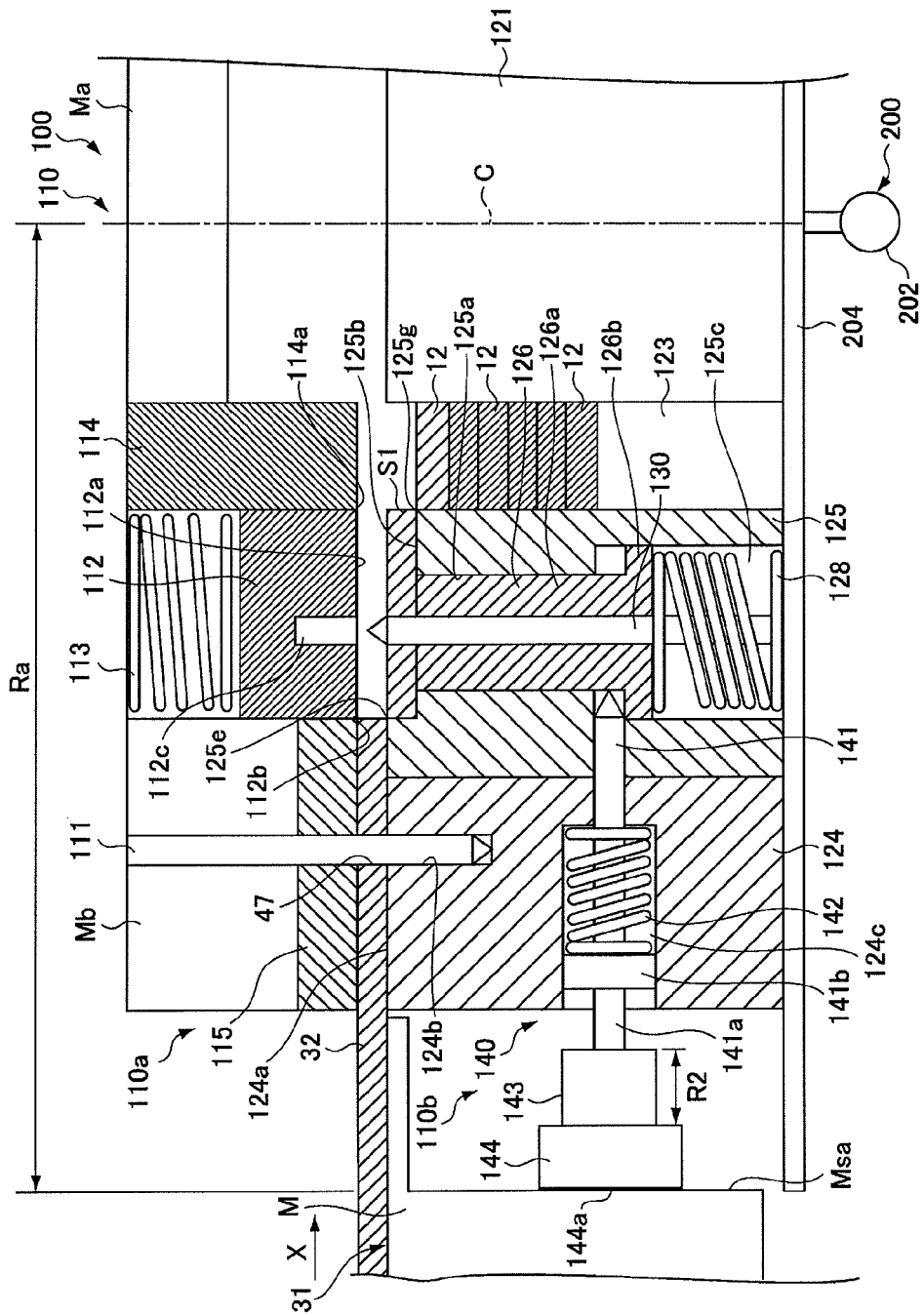
FIG. 12 is a schematic sectional view of the laminated body manufacturing apparatus taken along the line a-a of FIG. 6, explaining a process of the laminated body manufacturing method subsequent to FIG. 11.

As shown in FIG. 12, the gripping of the scrap members S1, S2 by the first punch 112 is released when the upper die 110a goes past the bottom dead center position and is moved upward in a reverse direction. At this time, since the lower pilot pin 130 is inserted into the pilot hole 47 of the scrap member S1, the scrap member S1 is maintained in a state of being placed in the stepped part 125b.

Further, as the upper die 110a is moved upward, the gripping of the sheet material 32 by the upper pressing member 115 is released and the upper pilot pin 111 is separated from the pilot holes 47, 47 of the cut-off member 32a. In this case, the pilot holes 47, 47 of the cut-off member 32a become "the pilot holes 47, 47 located at the most downstream side in the feeding direction" in the next cycle.

When the upper pilot pin 111 is separated from the pilot holes 47, 47 of the cut-off member 32a, the engagement of the upper die 110a and the lower die 110b is released and therefore the lower die 110b can be rotated.

Figure 13:
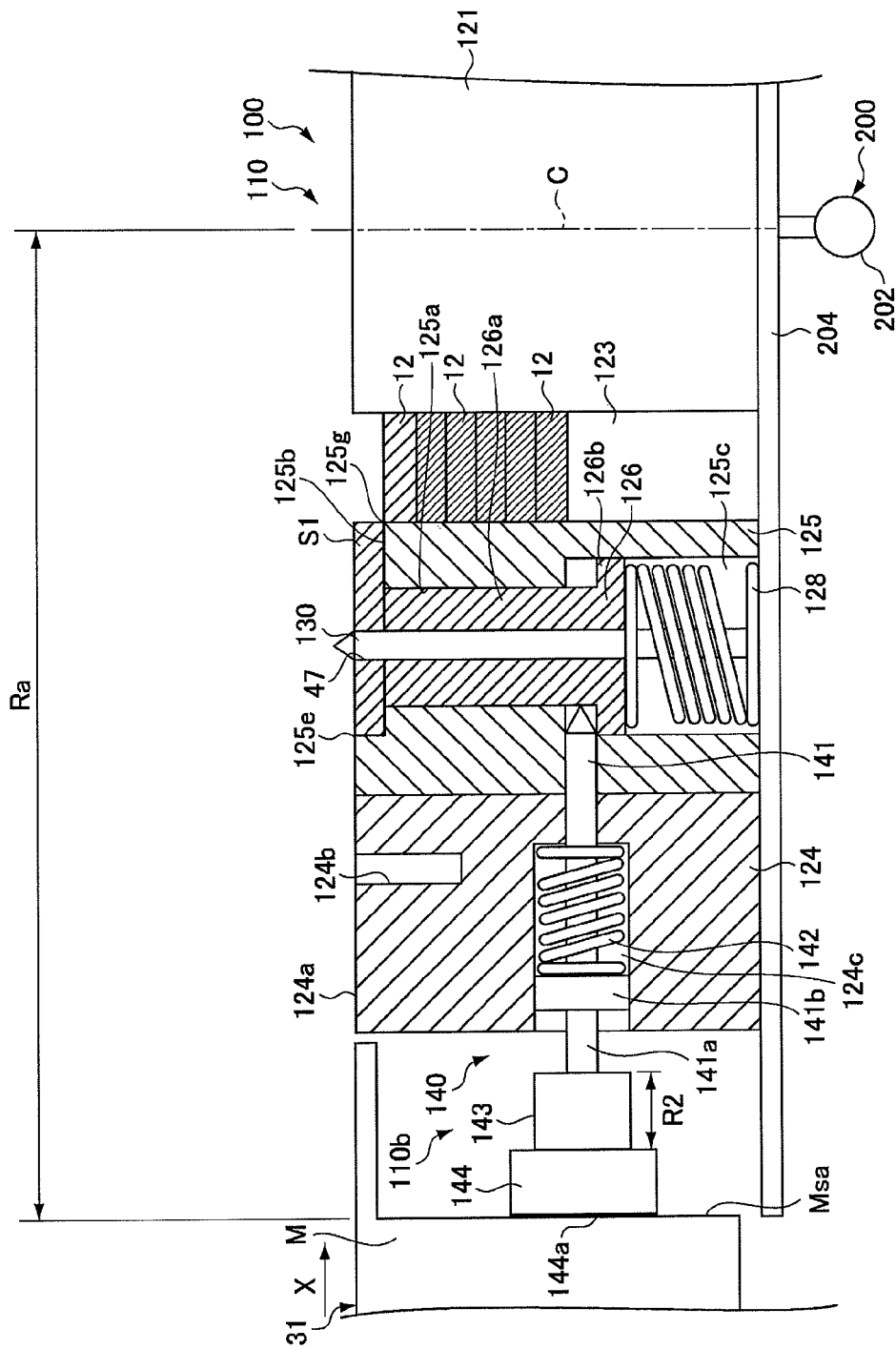
FIG. 13 is a schematic sectional view of the laminated body manufacturing apparatus taken along a line b-b of FIG. 6, explaining a process of the laminated body manufacturing method subsequent to FIG. 12.

FIG. 13 is a schematic sectional view taken along a line b-b of FIG. 6. The state shown in FIG. 13 refers to a state where the lower die 110b can be rotated and the position of the stepped part 125b of the lower die 110b on which the scrap member S1 is placed has been rotated to the position of the line b-b in the middle of rotation from the "A" position (the line a-a) toward the "C" position (the line c-c).

At this time, a centrifugal force as an outward force by the rotation of the lower die 110b is applied to the scrap member S1. However, since the lower pilot pin 130 is inserted through the pilot hole 47 in the scrap member S1, the scrap member S1 is still maintained without being separated from the lower pilot pin 130.

Figure 14:
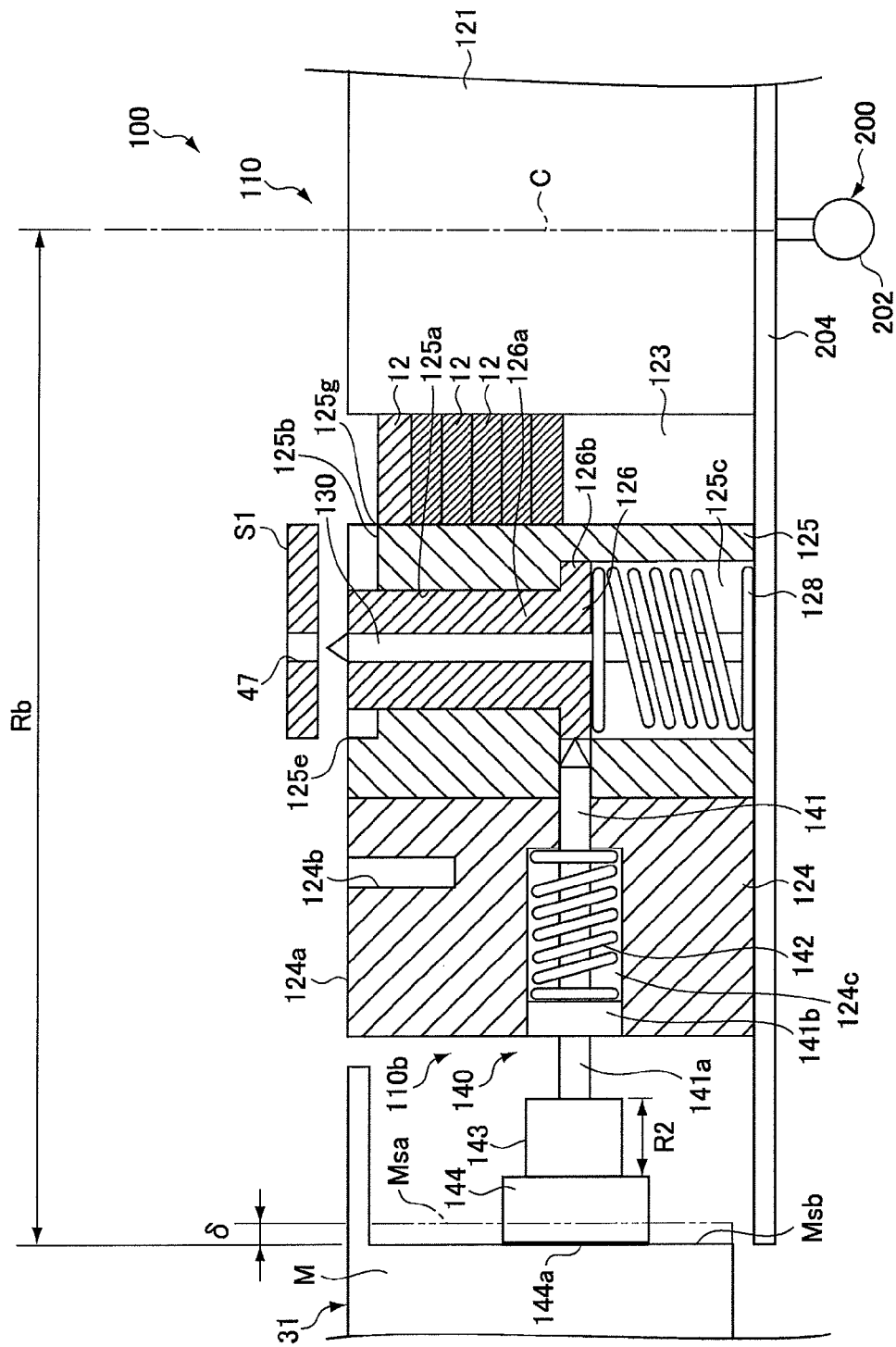
FIG. 14 is a schematic sectional view of the laminated body manufacturing apparatus taken along a line c-c of FIG. 6, explaining a process of the laminated body manufacturing method subsequent to FIG. 13.

FIG. 14 is a schematic sectional view taken along a line c-c of FIG. 6. The state shown in FIG. 14 refers to a state where a sliding surface of the sliding member 144 is switched from the sliding surface Msa to the sliding surface Msb by the rotation of the lower die 110b. A distance between the sliding member 144 and the rotation center C is expanded from the distance Ra between the sliding surface Msa of the frame M and the rotation center C to the distance Rb between the sliding surface Msb of the frame M and the rotation center C. Here, a position switched from the sliding surface Msa to the sliding surface Msb becomes the timing where the scrap member S1 is discharged. In this timing, the pin 141 is moved in a direction away from the pusher 126.

At this time, the leading end of the cylindrical part 126a of the pusher 126 is retreated to the stepped part 125b in the upper surface of the lower jig 125 and the leading end of the pin 141 is located at an upper side (the upper die 110a) of the collar part 126b of the pusher 126. For this reason, as the pin 141 is moved in a direction away from the pusher 126, the restriction for the upward movement (toward the upper die 110a) of the leading end of the pin 141 relative to the collar part 126b is eliminated. Accordingly, the pusher 126 is moved upward by the urging force of the compression coil 128 and the leading end of the cylindrical part 126a of the pusher 126 is projected from the stepped part 125b in the upper surface of the lower jig 125. At this time, the pusher 126 pushes up the scrap members S1, S2 which is fitted into the lower pilot pin 130 and thus the scrap members S1, S2 are separated.

Figure 15:
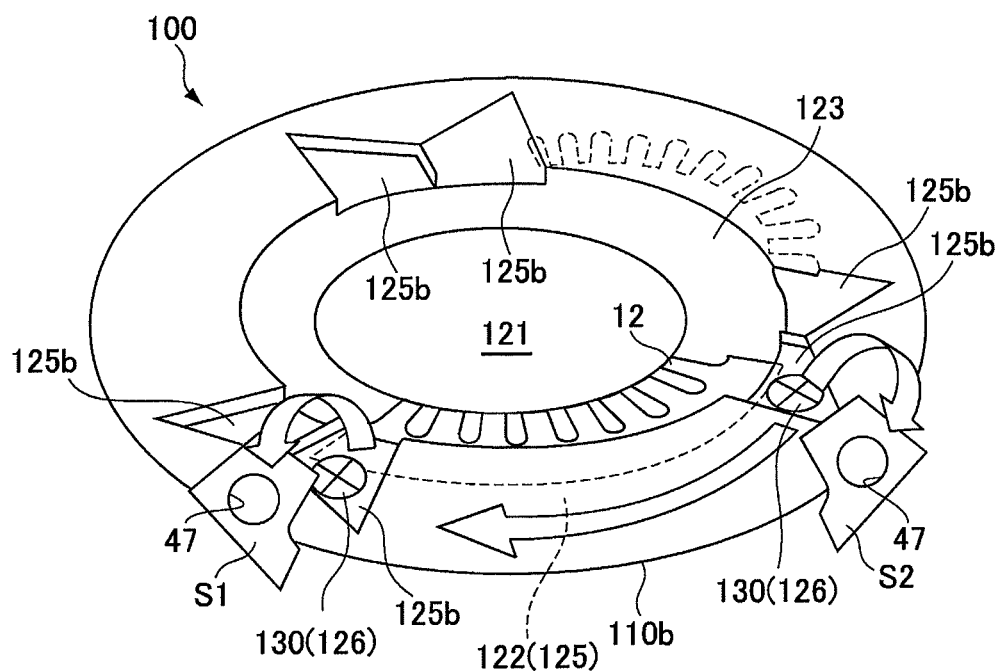
FIG. 15 is a schematic perspective view of the laminated body manufacturing apparatus, explaining the process of the laminated body manufacturing method shown in FIG. 14.

Accordingly, as shown in FIG. 15, the scrap member S1 is discharged to the outside of the press device 110 (the lower die 110b) by the centrifugal force as an outward force. Similarly, the scrap member S2 is also discharged to the outside at a predetermined timing.

In this way, according to the second exemplary embodiment, the lower die 110b is rotated, as shown in FIGS. 10 to 14, in a state where a chip-like scrap member cut from the sheet material by the cutting process shown in FIG. 7 and FIGS. 9 to 11 is placed in the press device 110. Accordingly, the scrap members S1, S2 are discharged to the outside of the press device 110 by the centrifugal force applied to the scrap members S1, S2.

Accordingly, since the chip-like scrap members are cut from the sheet material each time when the cutting process is carried out, there is almost no problem that the scrap members are flexed in a discharge process where the scrap members are discharged from the lower die of the press device to the outside of the lower die.

Further, since the chip-like scrap members are discharged to the outside of the lower die of the press device in accordance with the rotation by the rotation device, it is possible to effectively discharge the scrap members which are cut from the sheet material and separated from the segment.

The technical range of the present invention is not limited to the ranges described in the second exemplary embodiment.

For example, although the centrifugal force is used as an outward force in the second exemplary embodiment, the present invention is not limited to this. For example, the outward force may be a suction force by air or a magnetic force by a magnet.

Further, although the coupling between each layer in the laminated body is carried out by an adhesive in the second exemplary embodiment, the present invention is not limited to this. For example, the coupling between each layer may be carried out by a crimping process. In this case, a crimping dowel may be already formed in the segment when forming the segment from the sheet material by the press device. In this way, the crimping dowels may be coupled to each other when pushing the segments by the second punch.

Third Exemplary Embodiment

Figure 16:
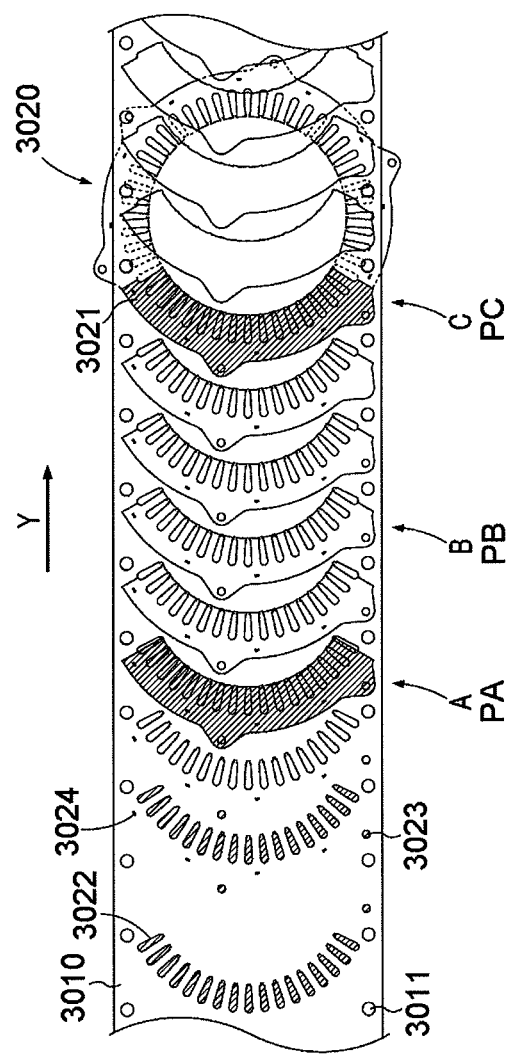
FIG. 16 is a view showing a state where a sheet material is processed by a laminated body manufacturing apparatus according to a third exemplary embodiment.

FIG. 16 shows a state where a sheet material is processed by a laminated body manufacturing apparatus according to a third exemplary embodiment. The laminated body manufacturing apparatus is intended for manufacturing a stator core as a laminated body. As shown in FIG. 16, the laminated body is manufactured by configuring one annular layer 3020 with three fan-shaped segments 3021 obtained by processing a band-like sheet material 3020 and laminating and coupling a predetermined number of annular layers 1020.

The sheet material 3010 is obtained by processing an electromagnetic steel plate into a thin belt shape and has a constant plate thickness. The plate thickness is about 0.15 to 0.5 mm. A central angle of the segment 3021 is 120°. Accordingly, one annular layer 3020 of a laminated body is configured by three segments 3021. The laminated body is configured by laminating a predetermined number of annular layers 3020. The number of the segments 3021 to configure one annular layer 3020 is not limited to three but may be the other number such as two, four or six, for example. However, it is noted that as the number of the segments becomes greater, the yield is improved but the production rate is decreased.

As shown in FIG. 16, the sheet material 3010 is formed into the segment 3021 through a plurality of machining process while being fed at a predetermined pitch. The machining process includes a half-punching process A for half-punching a part to be formed as the segment 3021, a flattening process B for forming the segment 3021 by pushing back a part to be formed as the half-punched segment 3021 to the sheet material 3010 and thus completely cutting the part from the sheet material 3010, a separating process C for separating the segment 3021 pushed back to the sheet material 3010 from the sheet material 3010 and coupling the separated segment on an annular layer 3020 located therebelow.

However, it is noted that a step for forming pilot holes 3011 required for positioning the sheet material 3010 in each machining process, a step for punching parts 3022 to be formed as winding slots of a stator core, a step for forming holes 3023 used in mounting the stator core on a motor, and a step for forming half-punching holes 3024 to couple the segments 3021 to each other by a crimping process are performed, prior to the half-punching process A.

Figure 17:
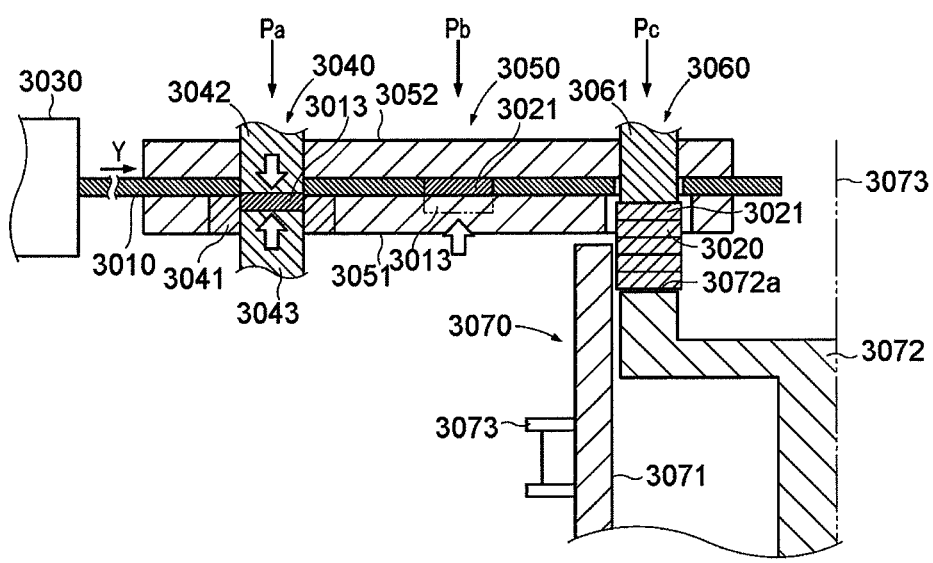
FIG. 17 is an explanatory view for explaining a main part of a laminated body manufacturing apparatus to perform the processing of FIG. 16.
Figure 18A:
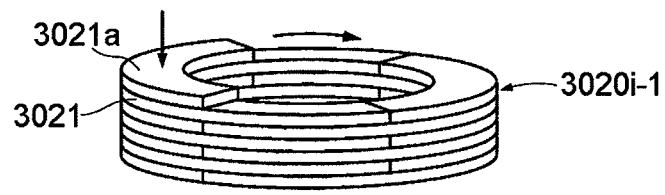
FIGS. 18 (*a*) to (*g*) are views showing a state where segments are coupled to an annular layer in the laminated body manufacturing apparatus of FIG. 17.
Figure 18B:
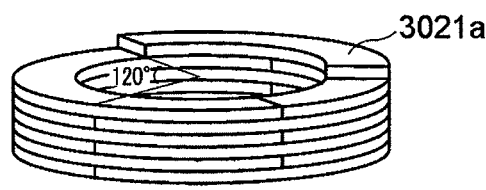
Figure 18C:
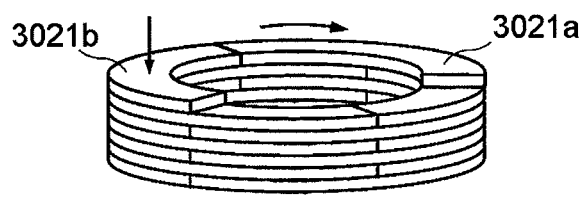
Figure 18D:
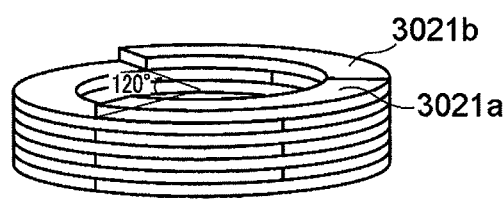
Figure 18E:
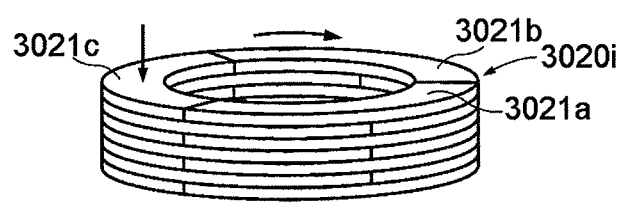
Figure 18F:
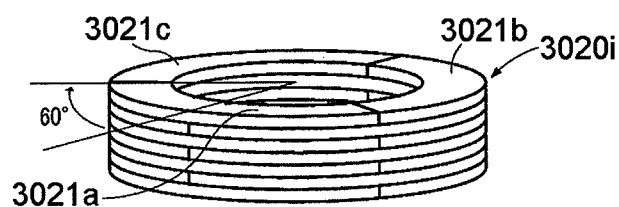
Figure 18G:
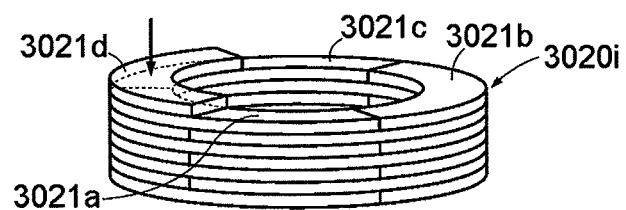

FIG. 17 is an explanatory view for explaining a main part of the laminated body manufacturing apparatus. As shown in FIG. 17, the laminated body manufacturing apparatus includes a feeding unit 3030 for intermittently feeding the sheet material 3010 at a predetermined feeding pitch in the Y direction, a half-punching unit 3040 for performing the half-punching in the half-punching process A, a flattening unit 3050 for performing the flattening processing in the flattening process B, and a pressing unit 3060 for performing the separating and coupling in the separating process C.

The laminated body manufacturing apparatus further includes a laminating guide 3070. The laminating guide 3070 holds and rotates the segments 3021 coupled by the pressing unit 3060 so that the segments 3021 to be coupled by the pressing unit 3060 are placed at a position to configure the laminating body.

The half-punching unit 3040 includes a die 3041 having a shape corresponding to the contour of the segment 3021, a main punch 3042 for half-punching a part of the sheet material 3010 to be formed as the segment 3021 by pushing the part to the die 3041, and a counter punch 3043 for giving a counter load. Reference numeral 3051 in FIG. 17 refers to a die plate which holds the die 3041 and reference numeral 3052 refers to a stripper plate which presses the sheet material 3010 and guides the main punch 3042 when the half-punching is performed by the main punch 3042.

The counter punch 3043 gives an upward counter load to a lower surface of a part of the sheet material 3010 to be half-punched against a pressing force of the main punch 3042 while the main punch 3042 pushes the sheet material 3010 to the die 3041. In order to generate the counter load, the counter punch 3043 is urged upward by a disc spring, etc.

The flattening unit 3050 is configured by the die plate 3051 and the stripper plate 3052. That is, when the main punch 3042 is lowered so as to perform the half-punching in the half-punching process A, the stripper plate 3052 is also lowered. At this time, for a half-punched part 3013 of the sheet material 3010 which is already subjected to the half-punching process A, the flattening processing in the flattening process B is performed by the die plate 3051 and the stripper plate 3052. That is, the flattening process B is automatically performed in an idle process from the half-punching process A to the separating process C.

The pressing unit 3060 includes a pressing member 6031 which is vertically guided by the stripper plate 3052. The pressing member 3061 is lowered when the stripper plate 3052 is lowered in order to perform the half-punching in the half-punching process A and thus the sheet material 3010 is sandwiched between the die plate 3051 and the stripper plate 3052. At this time, the pressing member 3061 presses the segment 3021 pushed back in the flattening process B to separate the segment from the sheet material 3010 and to couple the segment on the annular layer 3020 supported on the laminating guide 3070 located therebelow.

The laminating guide 3070 includes a cylindrical inner wall 3071 which is placed along an outer periphery of each laminated annular layer 3020 and a support member 3072 which supports the laminated annular layer 3020. The laminating guide 3070 can be supported to rotate integrally with the support member 3072 around a central axis 3073. A rotation position of the laminating guide is controlled by a rotation mechanism 3073. The rotation mechanism 3073 can be configured by a pulley fixed to an outer periphery of the laminating guide 3070, a toothed belt for rotating the pulley, etc.

A vertical position of the support member 3072 is controlled in accordance with the number of laminated annular layers 3020 by a drive unit (not shown). Specifically, the support member 3072 is controlled in such a way that the support member is lifted up to a predetermined position slightly below an upper surface of the die plate 3051 in an initial state where the annular layer 3020 is not laminated thereon and is lowered as the number of laminated annular layers 3020 is increased. In this way, an upper surface of an uppermost annular layer 3020 supported on the support member is controlled to be located at the predetermined position.

The laminating guide 3070 is controlled so as to rotate by a predetermined angle about its central axis 3073 every time when the separating process C is performed. By such a rotation, the segments 3021 supported by the laminating guide 3070 are also rotated by a predetermined angle in its circumferential direction. This rotation is carried out in such a way that the segments 3021 to be sequentially coupled to the uppermost annular layer 3020 are placed at a position to configure the laminated body.

FIGS. 18 (a) to (g) are views showing a state where the annular layer 3020 is formed. As shown in FIG. 18 (e), one annular layer 3020 (3020i) is configured by three segments 3021 (3021a to 3021c). A predetermined angle of rotation is performed so that the segments 3021 are stacked like a bricklaying. That is, two times of 120° rotation (FIGS. 18 (b) and (d)) and one time of 60° rotation (FIG. 18 (f)) are repeatedly carried out.

That is, the laminating guide 3050 is rotated by 120° (FIG. 18 (b)) when the first segment 3021a configuring an ith annular layer 3020i is received on an i−1th annular layer 3020i−1 (FIG. 18 (a)). And then, the laminating guide is further rotated by 120° (FIG. 18 (d)) when the next segment 3021b is received (FIG. 18 (c)) and then the next segment 3021c is received (FIG. 18 (e)). In this way, placing of three segments 3021a to 3021c at a position to configure the ith annular layer 3020i is completed (FIG. 18 (e)).

Next, the laminating guide 3050 is rotated by 60° (FIG. 18 (f)). At this time, the support member 3072 is lowered by the thickness of one annular layer 3020. Then, similarly to FIG. 18 (a), a segment 3021d configuring the next i+1th annular layer 3020 is received (FIG. 18 (g)). In this way, each of the annular layers 3020 is configured by three segments 3021. Also, the segments 3021 are placed so that each segment 3021 configures the laminated body stacked like a brick-laying.

Figure 19:
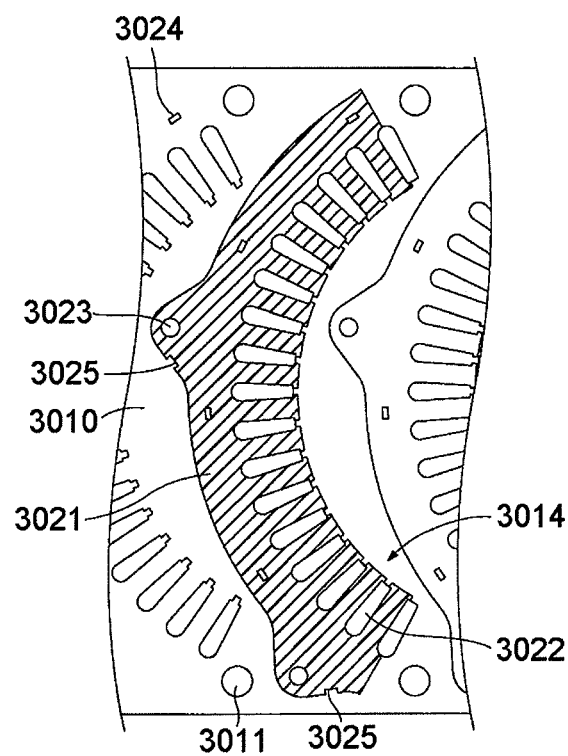
FIG. 19 is a view showing a part of a segment pushed back to the sheet material in a flattening processing which is performed by the laminated body manufacturing apparatus of FIG. 17.
Figure 20:
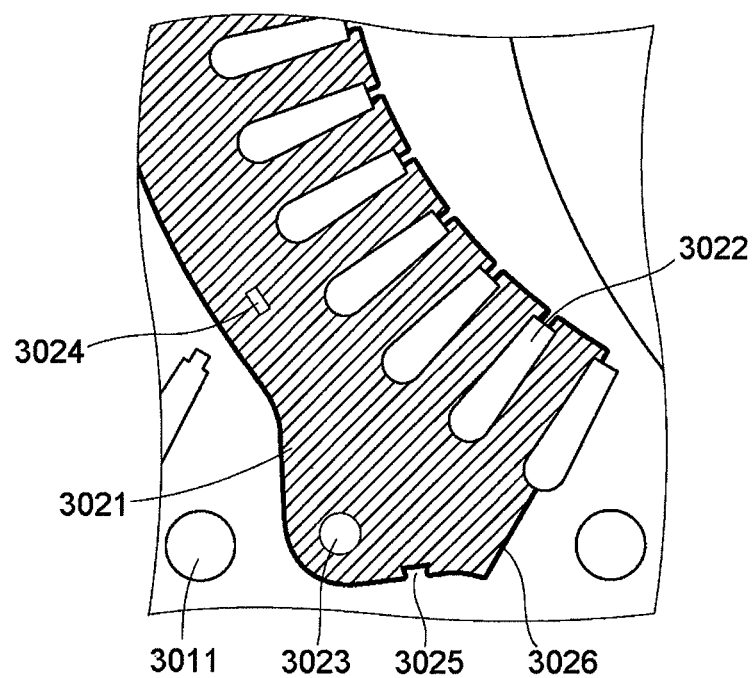
FIG. 20 is a partial enlarged view of FIG. 19.

FIG. 19 shows a part of the segment 3021 which is cut from the sheet material 3010 and pushed back to the sheet material 3010 in the flattening process B. FIG. 20 is an enlarged view showing a portion 3014 of FIG. 19. As shown in FIGS. 19 and 20, the segment 3021 includes a concave part 3025 like a dovetail groove at two locations of a periphery thereof. The thick line 3026 in FIG. 20 indicates a contour part of the segment 3021 which is brought into contact with the sheet material 3010. The segment 3021 is held by the sheet material 3010 through the contact of the contour part.

The concave part 3025 has a function to increase such a holding force. That is, the concave part 3025 prevents the segment 3021 from being removed from the sheet material 3010 until the flattening process B is performed and then the segment 3021 is separated in the separating process C. In particular, since the segment 3021 is easy to be removed from the sheet material as the sheet material 3010 is made of thinner material, it is necessary to provide the concave part 3025.

Accordingly, the concave part 3025 is provided in a shape, a size and a location suitable for preventing the removal of the segment. However, it is required that the concave part is formed radially outwardly of the segment 3025, so as not to affect the performance of the laminated body.

When the laminated body having the above configurations is manufactured, an operation of each part of the apparatus is controlled by a control unit and a control mechanism of the apparatus, which are not shown. Specifically, the sheet material 3010 is fed at a predetermined feeding pitch in the Y direction by the feeding unit 3030. Thereby, each part to be processed on the sheet material 3010 is sequentially fed to each processing position (the half-punching position PA, the flattening position PB, the separating position PC). The above-described machining process A to C is carried out in each processing position. Precise positioning in each processing position is achieved using the pilot holes 3011.

As shown in FIG. 16, each part to be processed is subjected to a plurality of machining process to have the pilot holes 3011, the winding slots 3022 and the half-punching holes 3024 and then sequentially processed in each machining process A to C. When performing the machining process A to C, the stripper plate 3052 is vertically moved at a constant period. FIG. 17 shows a state where the stripper plate 3052 is lowered and thus the sheet material 3010 is sandwiched between the die plate 3051 and the stripper plate 3052.

The sheet material 3010 is sequentially fed at a predetermined pitch in the Y direction in synchronous with a vertical movement of the stripper plate 3052. The feeding of the sheet material 3010 is carried out when the stripper plate 3052 is in a lifted position. At this time, both side ends of the sheet material 3010 are supported by a feeding guide (not shown) and the sheet material 3010 is fed in state of being pushed up from the die plate 3051.

In synchronous with the vertical movement of the stripper plate 3052, the machining process A to C for another part to be processed on the sheet material 3010 is performed in parallel in the processing positions Pa to Pc, as shown in FIG. 17.

FIGS. 21 (*a*) to (*f*) show an operation of the apparatus from a press bottom dead center to a press top dead center in the half-punching process A which is performed in the processing position Pa. In the processing position Pa, first, the main punch 3042 and the stripper plate 3052 are integrally lowered. As the stripper plate 3052 is lowered, the feed guide pushing up the sheet material 3010 is also pressed down.

When the sheet material 3010 is sandwiched between the stripper plate 3052 and the die 3041, the main punch 3042 is projected from the stripper plate 3052 against the counter load by the counter punch 3043 to push the sheet material 3010 into the die 3041 and reaches the bottom dead center, as shown in FIG. 21 (*a*). The position of the bottom dead center is set to leave about 20 to 30% of the plate thickness of the sheet material 3010 without being cut.

In this way, the part 3013 to be formed as the segment 3021 is in a state of being half-punched. Next, the main punch 3042 is lifted to return the counter punch 3043 to an original level and the stripper plate 3052 starts to be lifted (FIGS. 21 (*b*) to (*d*)). As a result, the feeding guide pressed down is also returned to push up the sheet material 3010 (FIG. 21 (*d*)).

And then, as the main punch 3042 is further lifted together with the stripper plate 3052 (see FIG. 21 (*e*)) and reaches the top dead center (FIG. 21 (*f*)), the feeding of the sheet material 3010 is started. Thereby, the half-punching by the machining process A is completed. At this time, a part corresponding to the above-described concave part 3025 is also formed.

In the processing position Pb, the flattening processing is performed in which the stripper plate 3052 is lowered to sandwich the sheet material 3010 between the stripper plate 3052 and the die plate 3051, as shown in FIG. 17. Thereby, the part 3013 to be half-punched in the machining process A is pushed back to the sheet material 3010. In this way, the half-punched part 3013 is completely cut from the sheet material 3010 and therefore formed as the segment 3021.

At this time, since the concave part 3025 formed as a portion of the contour of the segment and a convex part of the sheet material 3010 corresponding to the concave part are fitted to each other, fixation of the segment 3021 to the sheet material 3010 is reinforced. Accordingly, the segment 3021 is not removed from the sheet material 3010 until the segment is separated from the sheet material 3010 in the processing position Pc.

In the processing position Pc, the segment 3021 fitted to the sheet material 3010 is pressed by the pressing member 3061 and therefore pressed on the annular layer 3020 supported by the laminating guide 3070 located therebelow, when the stripper plate 3052 is lowered to sandwich the sheet material 3010 between the stripper plate 3052 and the die plate 3051. Thereby, the segment 3021 is separated from the sheet material 3010 and coupled to the annular layer 3020.

The coupling is carried out by fitting a convex shape of the half-punching holes 3024 of the segment 3021 to a concave shape of the corresponding half-punching holes 3024 of the annular layer 3020 located therebelow. However, the segment 3021 to be coupled is shifted by 60° relative to the segment 3021 of the annular layer 3020 located therebelow, as shown in FIG. 18 (*g*) and therefore is coupled to two segments 3021 located therebelow in a state of being straddled over these two segments 3021.

In this way, the segments 3021 which are sequentially received by the laminating guide 3070 are laminated so that the segments are placed at a position to configure the laminated body by the rotation of the laminating guide 3070 and the vertical movement of the support member 3072, as shown in FIGS. 18 (*a*) to (*g*).

That is, when the coupled segment 3021 is the first or the second segment 3021 configuring one annular layer 3020, the laminating guide 3070 is rotated by 120° after receiving the segment 3021 (FIGS. 18 (*a*) to (*d*)). When the coupled segment 3021 is the third segment 3021, the laminating guide 3070 is rotated by 60° and the support member 3072 is lowered by the thickness of the annular layer 3020 so that the next segment 3021 is stacked like a brick-laying in a state of being shifted by 60° (FIGS. 18 (*e*) and (*f*)).

When the segment 3021 cut off in the processing position Pc is a segment to configure the first annular layer 3020 in one laminated body, it is possible to prevent an unnecessary convex part from being formed at a lower end of the laminated body by forming the half-punching holes 3024 of the segment 3021 as through holes, instead of the half-punching holes.

In this way, when the lamination of several tens to several hundreds of annular layers 3020 is completed, the laminated annular layers 3020 are extracted as a laminating body from the laminating guide 3070.

According to the third exemplary embodiment, it is possible to perform the final separating process C by a simple control. That is, if the cutting is performed using a rotating die so as to separate the segment from the sheet material in the final process, it is required to simultaneously control the feeding pitch of the sheet material and the positioning of rotation position of the die with high precision.

By contrast, in the third exemplary embodiment, the segment 3021 is formed by being pushed back to the sheet material 3010 by the half-punching and the flattening. And then, in the final process, the segment 3021 in the sheet material 3101 is pressed and separated, so that the segment is coupled to the annular layer 3020 on the laminating guide 3070. Accordingly, it is not necessary to perform the positioning of the die and therefore it is possible to perform the final process by a simple control.

Further, as compared to a case where most of the unnecessary portions are punched out and removed in advance prior to reaching the final process, the rigidity of the sheet material 3010 is maintained to some extent till the final separating process C by the segment 3021 pushed back to the sheet material 3010 in the flattening process B. Accordingly, a web width of both sides of the sheet material 3010 is reduced and therefore it is possible to improve the yield. Further, since a process for punching and removing the unnecessary portions in advance is not necessary, it is possible to increase the production rate.

Further, since the concave part formed at a portion of the contour of the segment 3021 is fitted to the convex part of the corresponding sheet material 3010 in the flattening process B, the removal of the segment 3021 from the sheet material 3010 is prevented until the separating process C is carried out. Accordingly, it is possible to operate the laminated body manufacturing apparatus in a stable manner.

FIGS. 22 (a) to (f) show an operation of a push-back process in a laminated body manufacturing apparatus according to a modification of the third exemplary embodiment. In this manufacturing apparatus, the push-back process is employed, instead of the half-punching process A and the flattening process B described above. And, the formation of the segment 3021 and the pushed-back of the segment to the sheet material 3010 are carried out by the push-back process. Accordingly, the manufacturing apparatus includes a configuration for performing the push-back process, instead of the configuration for performing the half-punching process A and the flattening process B. The other configuration and process are the same as in the case of the third exemplary embodiment of FIG. 16.

As shown in FIGS. 22 (a) to (f), the laminated body manufacturing apparatus according to the modification of the third exemplary embodiment includes the following parts as a configuration for performing the push-back process. Specifically, the laminated body manufacturing apparatus includes a die 3081 having a shape corresponding to the contour of the segment 3021, a main punch 3082 for punching a part of the sheet material 3010 to be formed as the segment 3021 and forming the segment 3021 by pushing the part to the die 3081, a counter punch 3083 for giving a counter load, and a stripper plate 3084 for pressing the sheet material 3010 and guiding the main punch 3082 when the punching is performed by the main punch 3082.

The counter punch 3083 gives an upward counter load to a lower surface of a part of the sheet material 3010 to be punched out against a pressing force of the main punch 3082 while the main punch 3082 pushes the sheet material 3010 to the die 3081. In order to generate the counter load, the counter punch 3083 is urged upward by a disc spring, etc.

In the push-back process, first, the main punch 3082 and the stripper plate 3084 are integrally lowered. As the stripper plate 3084 is lowered, the feed guide pushing up the sheet material 3010 is also pressed down.

When the sheet material 3010 is sandwiched between the stripper plate 3084 and the die 3081, the main punch 3082 is projected from the stripper plate 3084 against the counter load by the counter punch 3083 to push the sheet material 3010 into the die 3081 and reaches the bottom dead center, as shown in FIG. 22 (a).

In this way, a part to be formed as the segment 3021 is punched out and formed as the segment 3021. In this case, the position of the bottom dead center is set to a position where the part to be formed as the segment 3021 is not completely cut. For example, the position of the bottom dead center may be set to leave about 20 to 30% of the plate thickness of the sheet material 3010 without being cut.

Next, the main punch 3082 is lifted and therefore the counter punch 3083 is returned to its original level (FIG. 22 (b)). In this way, the formed segment 3021 is pushed back to the sheet material 3010 and held by the sheet material 3021. Here, in a case where the position of the bottom dead center is set to a position where the part to be formed as the segment 3021 is in a state of being half-punched as described above, the cutting of the part is completed by the push-back operation and therefore the segment 3021 is formed.

Figure 22A:
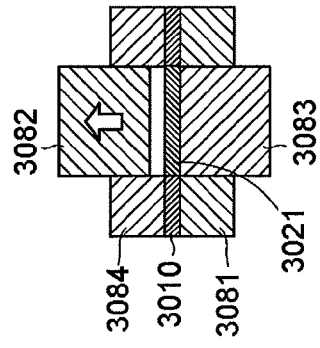
FIGS. 22 (*a*) to (*f*) are views showing an operation of a push-back process in a laminated body manufacturing apparatus according to a modification of the third exemplary embodiment.
Figure 22B:
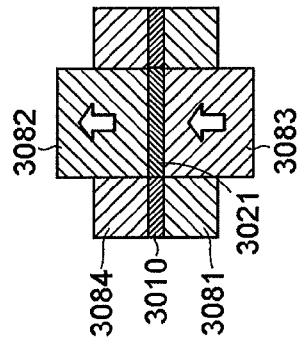
Figure 22C:
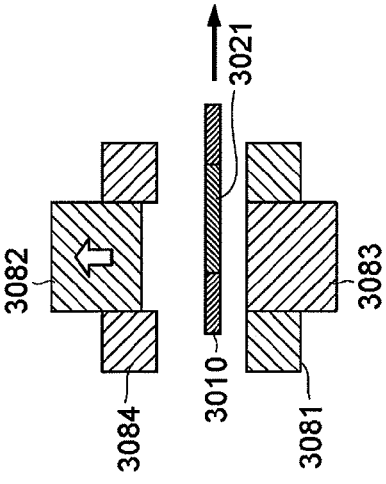
Figure 22D:
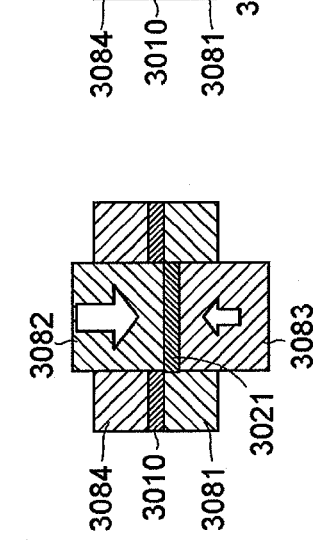

As the main punch 3082 is further lifted (FIG. 22 (c)), the stripper plate 3084 is also started to lift (FIG. 22(d)). As a result, the feeding guide pressed down is also returned to push up the sheet material 3010 (FIG. 22 (d)).

Figure 22E:
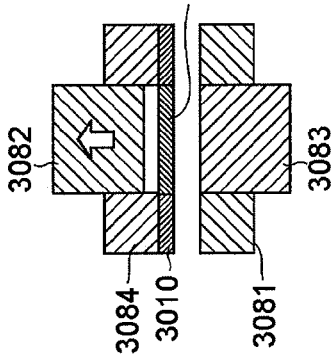
Figure 22F:
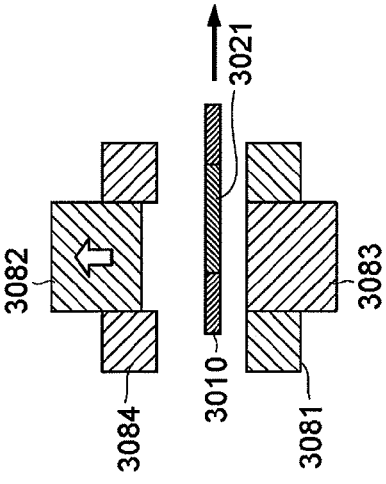

And then, as the main punch 3082 is further lifted together with the stripper plate 3084 (see FIG. 22(e)) and reaches the top dead center (FIG. 22 (f)), the feeding of the sheet material 3010 is started. Thereby, the push-back process is completed. The segment 3021 pushed back to the sheet material 3010 in the push-back process is separated from the sheet material 3010 and coupled on the annular layer 3020 located therebelow in the above-described separating process C.

A suitable modification of the third exemplary embodiment is also included in the present invention. For example, coupling between each annular layer 3020 may be reinforced by welding using a laser light. In this case, the concave part 3025 may be used as a welding groove. Further, the coupling between each annular layer 3020 may be carried out by bonding using an adhesive, instead of crimping performed by using the punched holes 3024.

Further, although a stator core is manufactured as the laminated body in the first to third exemplary embodiments, the present invention is not limited to this. For example, the present invention may be applied to a case of manufacturing other laminated body such as a rotor core.

In accordance with embodiments, a laminated body manufacturing apparatus for manufacturing an annular laminated body in which each layer 1020 is defined by a plurality of segments 1021 may include: a feeding unit 1030 that sequentially feeds a plurality of parts to be processed on a band-like sheet material 1010 to a predetermined processing position; a processing unit 1040 that separates the segment 1021 from each part to be processed by a shearing processing in the processing position; and a laminating unit 1050, 1060 that receives the segment 1021 which is separated and lowered onto the plurality of segments 1021 which are lowered and defining one layer 1020 in advance and that rotates the received segment by a predetermined angle in a circumferential direction of the segment 1021, each time when the shearing processing is performed, so as to place the sequentially lowered segment 1021 in a position to define the laminated body.

The processing unit 1040 may include a die plate 1044, a die 1041 which is held on the die plate 1044 and supports the sheet material 1010, and a punch 1042 which cuts off the segment 1021 from the sheet material 1010 by pushing the sheet material 1010 to the die 1041. The laminating unit 1050, 1060 may include a laminating guide 1050 which has a support member 1053 that supports the annular layer 1020 defined by the separated segments 1021 and a rotation mechanism 1060 that rotates the laminating guide 1050. The punch 1042 may be non-rotatably fixed relative to the die plate 1044 and the laminating guide may be rotatably supported relative to the die plate 1044.

According to the above structure, the segment is sheared and lowered in the processing position and then received onto the laminating unit. And, the arrangement of the segment is carried out by the rotation of the laminating unit. That is, since the laminating unit is rotated instead of rotating a master die having a large inertia, the laminating unit can be rapidly rotated and positioned. Accordingly, it is possible to improve the production rate of the laminated body.

In accordance with embodiments, a laminated body manufacturing method, in which a laminated body 10 is manufactured by laminating segments 12 which are cut from a sheet material 32 by a press device 100 including an upper die 110*a* and a lower die 110*b*, may include: a cutting process of cutting the segment 12 and a chip-like scrap member S1, S2 from the sheet material 32 by the lower die 110*b* in a state where the sheet material 32 is placed on the lower die 110*b*; and a discharge process of discharging the scrap member S1, S2 to an outside of the lower die 110*b* by an outward force which is applied to the scrap member S1, S2 by rotating the lower die 110*b* in a state where the scrap member S1, S2 is placed on the lower die 110*b*.

According to this manufacturing method, the scrap members are discharged to the outside of the lower die by the outward force which is applied to the scrap members by rotating the lower die in a state where the chip-like scrap members cut from the sheet material by the cutting process are placed in the lower die.

In this way, since the chip-like scrap members are cut from the sheet material and discharged from the lower die to the outside each time when the cutting process is performed, there is no problem that the scrap members are flexed and thus are not discharged from the lower die.

Further, since the chip-like scrap members are discharged to the outside by the rotation of the lower die, it is possible to effectively discharge the scrap members cut from the sheet material and separated from the segment to the outside of the lower die.

The discharge process may include: a process of rotating the lower die 110*b* in a state where the scrap member S1, S2 is held by a scrap member holding device 130 provided in the lower die 110*b*; and a process of releasing the scrap member S1, S2 by the scrap member holding device 130 at a discharging timing during the lower die 110*b* is rotating while holding the scrap member S1, S2.

According to this manufacturing method, since the scrap members are held in the lower die by the scrap member holding device, the lower die is rotated and the scrap member holding device releases the holding of the scrap members at a timing of discharging, it is possible to more securely discharge the scrap members to the outside of the lower die. Here, the timing of discharging may be set by the rotation angle of the lower die, for example.

In accordance with embodiments, a laminated body manufacturing apparatus 100 for manufacturing a laminated body 10 by laminating segments 12 which are cut from a sheet material 32 may include: a press device 110 including an upper die 110*a* and a lower die 110*b* which cut a segment 12 and a chip-like scrap member S1, S2 from the sheet material 32 in a state where the sheet material 32 is placed therein; and a rotation device 200 that discharges the scrap member S1, S2 to an outside of the lower die 110*b* by an outward force which is applied to the scrap member S1, S2 by rotating the lower die 110*b* in a state where the scrap member S1, S2 is placed on the lower die 110*b*.

According to the above structure, the scrap members are discharged to the outside of the lower die by the outward force which is applied to the scrap members by rotating the lower die in a state where the chip-like scrap members cut from the sheet material by the upper die and the lower die are placed in the lower die.

In this way, since the chip-like scrap members are cut from the sheet material and discharged from the lower die to the outside each time when the press cutting is performed by the upper die and the lower die, there is no problem that the scrap members are flexed and thus are not discharged from the lower die.

Further, since the chip-like scrap members are discharged to the outside by the rotation of the lower die, it is possible to effectively discharge the scrap members cut from the sheet material and separated from the segment.

The lower die 110*b* may include a scrap member holding device 130 driven by a synchronous mechanism 140. The scrap member holding device 130 may be configured to hold the scrap member S1, S2 when the lower die 110*b* is rotated and to release the scrap member S1, S2 at a discharging timing when the lower die 110*b* is rotated while holding the scrap members S1, S2.

According to the above structure, since the scrap members are temporarily held in the scrap member holding device and the scrap member holding device releases the holding of the scrap members at a timing of discharging, it is possible to more securely discharge the scrap members to the outside. Here, the timing of discharging may be set by the rotation angle of the lower die, for example.

In accordance with embodiments, a laminated body manufacturing method, in which an annular laminated body each layer 3020 of which is defined by a plurality of segments 3021 is manufactured, may include: a feeding process of sequentially feeding a plurality of parts to be processed on a band-like sheet material 3010 to a first position PA, PB and a second position PC; a forming process of forming the segment 3021 and pushing back the segment to the sheet material 3010 by performing a predetermined processing for each part to be processed at the first position PA, PB; a separating process of separating the segment from the sheet material 3020 by pressing the segment 3021 pushed back to the sheet material at the second position PC; and a laminating process of receiving the separated and lowered segment 3021 onto the plurality of segments 3021 which are lowered and defining one layer in advance and rotating the received segment by a predetermined angle in a circumferential direction of the segment 3021, each time when the separating process is performed, so as to place the sequentially lowered segment 3021 in a position to define the laminated body.

According to this manufacturing method, since it is only required for pressing the segment pushed back to the sheet material to separate the segment from the sheet material and feeding the segment to the laminating guide in the final separating process and laminating process, it is not necessary to simultaneously control the feeding pitch of the sheet material and the positioning of the rotating die with high precision. Accordingly, it is possible to perform the final separating process and laminating process by a simple control.

Further, the rigidity of the sheet material is maintained to some extent till the final separating process and laminating process by the segment pushed back to the sheet material in the forming process. Accordingly, a web width of both sides of the sheet material is reduced and therefore it is possible to improve the yield. Further, since a process for punching and removing the unnecessary portions in advance is not necessary, it is possible to increase the production rate.

In the above manufacturing method, the first position may include a half-punching position PA and a flattening position PB. The feeding process may include a process of sequentially feeding each part to be processed to the half-punching position PA and the flattening position PB. The forming process may include: a half-punching process of half-punching a part to be formed as the segment 3021 by performing a half-punching processing for each part to be processed in the half-punching position PA; and a flattening process of cutting the half-punched part from the sheet material 3010 so as to form the segment 3021 and pushing back the segment to the sheet material 3021 by performing a flattening processing for each half-punched part to be processed in the flattening position PB.

According to this manufacturing method, the half-punched part is cut from the sheet material by the flattening processing to form the segment. Accordingly, burrs can be less likely to occur during the formation of the segment.

In accordance with embodiments, a laminated body manufacturing apparatus for manufacturing an annular laminated body in which each layer 3020 is defined by a plurality of segments 3021 may include: a feeding unit 3030 that sequentially feeds a plurality of parts to be processed on a band-like sheet material 3010 to a first position PA, PB and a second position PC; a forming unit 3040, 3050 that forms the segment 3021 by performing a predetermined processing for each part to be processed and pushes back the segment to the sheet material 3010, at the first position PA, PB; a separating unit 3060 that separates the segment from the sheet material 3020 by pressing the segment 3021 pushed back to the sheet material, at the second position PC; and a laminating unit 3070 that receives the separated and lowered segment 3021 onto the plurality of segments 3021 which are lowered and defining one layer in advance and rotates the received segment by a predetermined angle in a circumferential direction of the segment 3021, each time when the separating is performed by the separating unit 3060, so as to place the sequentially lowered segment 3021 in a position to define the laminated body.

According to the above structure, it is possible to perform the final process for separating the segment from the sheet material and laminating the segment by a simple control. Further, a web width of both sides of the sheet material is reduced and therefore it is possible to improve the yield. Further, since it is not necessary to punch the unnecessary portions, it is possible to increase the production rate.

In the above structure, the first position may include a half-punching position PA and a flattening position PB. The feeding unit 3030 may be configured to sequentially feed each part to be processed to the half-punching position PA and the flattening position PB. The forming unit 3040, 3050 may include: a half-punching unit 3040 that half-punches a part to be formed as the segment by performing a half-punching processing for each part to be processed at the half-punching position PA; and a flattening unit 3050 that cuts the half-punched part from the sheet material 3010 to form the segment 3021 and pushing back the formed segment to the sheet material 3021 by performing a flattening processing for each half-punched part at the flattening position PB.

According to the above configuration, burrs can be less likely to occur during the formation of the segment.

In accordance embodiments, a laminated body manufacturing method, in which an annular laminated body each layer 3020 of which is defined by a plurality of segments 3021 is manufactured, may include: a feeding process of sequentially feeding each part to be processed on a band-like sheet material 3010 to a half-punching position PA, a flattening position PB and a separating position C; a half-punching process of half-punching a part to be formed as the segment 3021 by performing a half-punching processing for each part to be processed at the half-punching position PA; a flattening process of cutting the half-punched part from the sheet material 3010 to form the segment 3021 and pushing back the segment to the sheet material 3021 by performing a flattening processing for each half-punched part at the flattening position PB; a separating process of separating the segment from the sheet material 3020 by pressing the segment 3021 pushed back to the sheet material 3010 at the separating position PC; and a laminating process of receiving the separated and lowered segment 3021 onto the plurality of segments 3021 which are lowered and defining one layer in advance and rotating the received segment by a predetermined angle in a circumferential direction of the segment 3021, each time when the separating process is performed, so as to place the sequentially lowered segment 3021 in a position to define the laminated body. In the half-punching process, a concave part 3025 may be formed at a portion of a contour of the segment 3021 such that the concave part 3025 fits in a corresponding convex part of the sheet material 3010 when the flattening processing is carried out so as to prevent the pushed-back segment from being removed from the sheet material until the separating process is carried out.

According to this manufacturing method, since it is only required for pressing the segment pushed back to the sheet material to separate the segment from the sheet material and feeding the segment to the laminating guide in the final separating process, it is not necessary to simultaneously control the feeding pitch of the sheet material and the positioning of the rotating die with high precision. Accordingly, it is possible to perform the final process by a simple control.

Further, the rigidity of the sheet material is maintained to some extent till the final separating process by the segment pushed back to the sheet material in the flattening process. Further, a web width of both sides of the sheet material is reduced and therefore it is possible to improve the yield. Further, since a process for punching and removing the unnecessary portions in advance is not necessary, it is possible to increase the production rate.

Further, since the concave part formed at a portion of the contour of the segment is fitted to the convex part of the corresponding sheet material, the removal of the segment from the sheet material is prevented until the separating process is carried out. Accordingly, it is possible to manufacture the laminated body in a stable manner.

In accordance with embodiments, a laminated body manufacturing apparatus for manufacturing an annular laminated body in which each layer 3020 is defined by a plurality of segments 3021 may include: a feeding unit 3030 that sequentially feeds each part to be processed on a band-like sheet material 3010 to a half-punching position PA, a flattening position PB and a separating position C; a half-punching unit 3040 that half-punches a part to be formed as the segment 3021 by performing a half-punching processing for each part to be processed at the half-punching position PA; a flattening unit 3050 that cuts the half-punched part from the sheet material 3010 to form the segment 3021 and pushes back the segment to the sheet material 3021 by performing a flattening processing for the each half-punched part to be processed in the flattening position PB; a separating unit 3060 that separates the segment from the sheet material 3020 by pressing the segment 3021 pushed back to the sheet material 3010 at the separating position PC; and a laminating unit 3070 that receives the separated and lowered segment 3021 onto the plurality of segments 3021 which are lowered and defining one layer in advance and rotates the received segment by a predetermined angle in a circumferential direction of the segment 3021, each time when the separating is performed by the separating unit 3060, so as to place the sequentially lowered segment 3021 in a position to define the laminated body. The half-punching unit 3040 may perform the half-punching processing so as to form a concave part 3025 at a portion of the contour of the segment 3021 such that the concave part 3025 fits in a corresponding convex part of the sheet material 3010 when the flattening processing is carried out and that the pushed-back segment 3021 is prevented from being removed from the sheet material 3010.

According to the above configuration, it is possible to perform the final process for separating the segment from the sheet material by a simple control. Further, a web width of both sides of the sheet material is reduced and therefore it is possible to improve the yield. Further, since a process for punching the unnecessary portions in advance is not necessary, it is possible to increase the production rate. In addition, since a removal prevention function by the concave part is imparted, it is possible to drive the manufacturing apparatus in a stable manner.

DESCRIPTION OF REFERENCE NUMERAL

1010 . . . SHEET MATERIAL, 1020 . . . ANNULAR LAYER, 1021 . . . SEGMENT, 1030 . . . FEED UNIT (FEEDING UNIT), 1040 . . . CUTTING UNIT, 1041 . . . DIE, 1042 . . . PUNCH, 1050 . . . LAMINATING GUIDE

C . . . ROTATION CENTER, Msa . . . SLIDING SURFACE, Msb . . . SLIDING SURFACE, 51 . . . SCRAP MEMBER, S2 . . . SCRAP MEMBER, 10 . . . IRON CORE, 12 . . . SEGMENT, 30 . . . IRON CORE MANUFACTURING LINE, 31 . . . FORMING DEVICE, 32 . . . SHEET MATERIAL (THIN PLATE), 100 . . . LAMINATED BODY MANUFACTURING APPARATUS, 110 . . . PRESS DEVICE, 110A . . . UPPER DIE, 110B . . . LOWER DIE, 111 . . . UPPER PILOT PIN, 112 . . . FIRST PUNCH, 113 . . . COMPRESSION COIL, 114 . . . SECOND PUNCH, 115 . . . UPPER PRESSING MEMBER, 124 . . . LOWER PRESSING MEMBER, 125 . . . LOWER GIG, 126 . . . PUSHER, 128 . . . COMPRESSION COIL, 130 . . . LOWER PILOT PIN, 143 . . . ELASTIC BODY, 144 . . . SLIDING MEMBER, 144A . . . SLIDING SURFACE, 200 . . . ROTATION DEVICE

3010 . . . SHEET MATERIAL, 3020 . . . ANNULAR LAYER, 3021 . . . SEGMENT, 3030 . . . FEEDING UNIT, 3040 . . . HALF-PUNCHING UNIT, 3041, 3081 . . . DIE, 3042, 3082 . . . MAIN PUNCH, 3043, 3083 . . . COUNTER PUNCH, 3050 . . . FLATTENING UNIT, 3051 . . . DIE PLATE, 3052, 3084 . . . STRIPPER PLATE, 3060 . . . PRESSING UNIT, 3070 . . . LAMINATING GUIDE

The invention claimed is:

1. A laminated body manufacturing method in which a laminated body is manufactured by laminating segments which are cut from a sheet material by a press device including an upper die and a lower die, the manufacturing method comprising:

cutting the segment and a chip-like scrap member from the sheet material by the lower die in a state where the sheet material is placed on the lower die; and discharging the scrap member to an outside of the lower die by an outward force which is applied to the scrap member by rotating the lower die in a state where the scrap member is placed on the lower die, wherein, during discharging the scrap member, the lower die that holds the scrap member is rotated by a scrap member holding device provided in the lower die, and the scrap member holding device releases the scrap member at a discharging timing during the lower die is rotating while holding the scrap member.

\* \* \* \* \*